US007231080B2

(12) United States Patent
Hakim et al.

(10) Patent No.: US 7,231,080 B2
(45) Date of Patent: Jun. 12, 2007

(54) MULTIPLE OPTICAL INPUT INSPECTION SYSTEM

(75) Inventors: Saki Itzhak Hakim, Kfar Saba (IL); Zeev Smilansky, Meishar (IL)

(73) Assignee: Orbotech Ltd., Yavne (IL)

( * ) Notice: Subject to any disclaimer, the term of this patent is extended or adjusted under 35 U.S.C. 154(b) by 742 days.

(21) Appl. No.: 09/782,626

(22) Filed: Feb. 13, 2001

(65) Prior Publication Data

US 2002/0154810 A1    Oct. 24, 2002

(51) Int. Cl.
*G06K 9/00* (2006.01)
(52) U.S. Cl. .............. 382/149; 348/87; 356/237.1
(58) Field of Classification Search .......... 382/141, 382/144–151, 164–165, 168–172, 190, 191, 382/199, 203, 209, 224, 254, 266, 263, 274, 382/275, 279; 348/87, 126, 94, 125, 127, 348/129–131; 345/615; 356/237.1, 237.2, 356/237.4, 237.5, 237.6, 239.1, 239.3, 239.7; 250/559.42, 559.44
See application file for complete search history.

(56) References Cited

U.S. PATENT DOCUMENTS

| 4,692,690 A | 9/1987 | Hara et al. ............... 356/394 |
| 4,786,813 A | 11/1988 | Svanberg et al. ........ 250/461.1 |
| 5,440,566 A | 8/1995 | Spence et al. ............... 374/41 |
| 5,483,603 A | 1/1996 | Luke et al. ................. 382/147 |
| 5,524,152 A | 6/1996 | Bishop et al. .............. 382/165 |
| 5,586,058 A | 12/1996 | Aloni et al. ................. 702/35 |
| 5,619,429 A | 4/1997 | Aloni et al. ................ 700/279 |
| 5,774,572 A | 6/1998 | Caspi ......................... 382/141 |
| 5,774,573 A | 6/1998 | Caspi et al. ................ 382/141 |
| 5,970,167 A | 10/1999 | Colvin ....................... 382/149 |
| 6,002,792 A | 12/1999 | Oguri et al. ............... 382/145 |
| 6,175,645 B1 | 1/2001 | Elyasaf et al. ............. 382/147 |
| 6,373,917 B1* | 4/2002 | Roder ......................... 378/22 |
| 6,603,877 B1* | 8/2003 | Bishop ....................... 382/165 |

FOREIGN PATENT DOCUMENTS

| EP | 0452905 | 10/1991 | ............ 250/559.44 |
| WO | WO 99/66314 | * 12/1999 | |
| WO | WO 00/11454 | * 3/2000 | |
| WO | WO 00/19372 | 4/2000 | |

OTHER PUBLICATIONS

Neubauer, "Intelligent X-Ray Inspection for Quality Control of Solder Joints," IEEE 1997, pp. 111-120.*
Longbotham et al., "X-Ray Stereo Imaging Technique for Disparity Analysis," IEEE 1995, pp. 24-26.*
M. Chapron, "A New Chromatic Edge Detector Used for Color Image Segmentation", 11th *APR International Conference on Pattern Recognition*, vol. III IEEE Computer Society Press, pp. 311-314, 1992, Los Alamitos, CA, USA.

(Continued)

*Primary Examiner*—Samir Ahmed
(74) *Attorney, Agent, or Firm*—Ladas & Parry

(57) ABSTRACT

A system and method of inspecting electrical circuits with multiple optical inputs, including: obtaining first and second image data that are generally spatially coincidental but which each include some image data that is different, modifying one of the images by employing the other image so as to produce an enhanced representation of the electrical circuit, and inspecting the enhanced representation for defects.

50 Claims, 15 Drawing Sheets

OTHER PUBLICATIONS

Philippe Pujas and Marie-Jose Aldon, "Robust Colour Image Segmentation", *7th International Conference on Advanced Robotics*, pp. 1-14, Sep. 22, 1995, San Filiu De Guixols, Spain.

Leila Shararenko, Marie Petrou, and Josef Kittler, "Automatic Watershed Segmentation of Randomly Textured Colour Images", *IEEE Transactions on Image Processing*, vol. 6, No. 11, pp. 1530-1543, 1997.

D. Marr and E. Hildreth, "Theory of Edge Detection", *Proceeding of Royal Society*, B 207, pp. 187-217, 1980, London, Great Britain.

* cited by examiner

MULTIPLE OPTICAL INPUT INSPECTION SYSTEM

FIELD OF THE INVENTION

The present invention relates to automated optical inspection of electrical circuits generally and in particular to methods and apparatus for generating improved representations of electrical circuits for use in the inspection thereof.

BACKGROUND OF THE INVENTION

Various types of devices for automated optical inspection of electrical circuits are known. Typically one or more gray level images of an electrical circuit under inspection are acquired. In some conventional devices for automated optical inspection of electrical circuits a binary representation of the electrical circuit, generated from a gray level image of the electrical circuit, is employed for at least some inspection operations. In some automated optical inspection applications the binary representation of an electrical circuit under inspection has a spatial resolution which is higher than the spatial resolution of the gray level image.

The PC Micro II™ and Inspire™ 9060 automated optical inspection systems, available from Orbotech Ltd. of Israel, are representative of conventional automated optical inspection systems for inspecting electrical circuits. In these conventional systems a gray level image of an electrical circuit under inspection is acquired. In a first channel the gray level image is convolved with a function approximating the Laplacian of a Gaussian function. In a second channel a threshold is applied to pixels in the same gray level image to determine which pixels in the image are representative of either conductor or substrate, to a high degree of confidence. The output of the second channel is applied to the output of the convolved image from the first channel to modify the convolved image. The locations of zero-crossings between oppositely signed pixels in the modified convolved image are calculated, and the zero-crossings subsequently are employed to generate an improved resolution binary image of an electrical circuit being inspected.

In other conventional devices for automated optical inspection of electrical circuits a contour representation of the electrical circuit, generated from the gray level image of the electrical circuit is employed for at least some inspection operations. Contours are an approximation of the location of the transition between regions exhibiting optically distinguishable characteristics, for example between conductor and substrate in an electrical circuit.

Additionally, color image acquisition systems recently have been employed in the automated optical inspection of electrical circuits.

The following reference describes edge detection methods:

D. Marr and E. Hildreth, *Theory of Edge Detection*, Proceedings of the Royal Society of London.

The following references describe color image processing methods:

M. Chapron, "*A New Chromatic Edge-Detector Used for Color Image Segmentation*", 11th APR International Conference on Pattern Recognition, Vol. III. IEEE Computer Society Press, Los Alamitos, Calif., USA, 1992.

Philippe Pujas and Marie-Jose Aldon, "*Robust Colour Image Segmentation*", 7th International Conference on Advanced Robotics, San Filiu de Guixols, Spain, Sep. 22, 1995, and Leila Shararenko, Maria Petrou, and Josef Kittler, "*Automatic Watershed Segmentation of Randomly Textured Colour Images*, IEEE Transactions on Image Processing, Vol. 6, no. 11, 1997.

The following U.S. patent application and published PCT patent application describe color image processing methods:

U.S. Pat. No. 5,483,603 and WO 00/11454

The following U.S. patents and published PCT patent application describe techniques employed in automated optical inspection of electrical circuits:

U.S. Pat. No. 5,774,572, U.S. Pat. No. 5,774,573, U.S. Pat. No. 5,586,058, U.S. Pat. No. 5,619,429, WO 00/19372 and U.S. Pat. No. 6,175,645.

SUMMARY OF THE INVENTION

The present invention seeks to provide improved techniques and apparatus for automated optical inspection of electrical circuits. Additionally, the present invention seeks to provide apparatus and methods for generating improved representations of electrical circuits, for example contour representations and binary representations of electrical circuits, which may be employed in the automated optical inspection thereof.

A general aspect of the present invention relates to methods for generating a representation of an electrical circuit having enhanced contrast between selected portions therein. One implementation of the invention relates to generating an enhanced contrast representation of an electrical circuit formed on a non-opaque substrate, however the method may be employed wherever it is necessary to enhance contrast between portions of an electrical circuit portions in an image of the electrical circuit.

Preferably the method for generating a representation of an electrical circuit having enhanced contrast includes evaluating various portions of multiple optical inputs, such as a digital image, of an electrical circuit and, in accordance with predetermined logic, enhancing contrast by: i) selectively allowing some portions of the digital image to retain optical intensity values appearing in the image, and ii) assigning synthetic values to other portions of the digital image. Preferably, the assignment of synthetic values to enhance contrast is performed in a non-linear fashion. For example, the enhancement of contrast may include allowing only portions in the image that correspond to conductors located on the top side of a substrate and non-opaque substrate overlaying conductors on a bottom side thereof to retain an optical intensity value appearing in the digital image, and assigning a synthetic value that is characteristic of substrate overlaying conductors to all of the portions in the image which correspond to non-opaque substrate.

A general aspect of the present invention relates to a technique for generating an enhanced representation of an electrical circuit using multiple optical inputs. The multiple optical inputs may be, for example, a combination of one or more red, green and blue image inputs. A representation of the electrical circuit is generated using first image inputs. Other image inputs, containing information not in the first image inputs, are employed during generation of a representation of an electrical circuit being inspected to modify the representation and provide an enhanced output representing the electrical circuit. The enhanced output representing the electrical circuit typically is used in a conventional manner to inspect the electrical circuit for defects.

In accordance with a preferred embodiment of the invention a digital image of an electrical circuit is acquired and convolved with a function to produce a pixelized convolution map of the electrical circuit. A representation of the electrical circuit derived from image inputs including information not in the digital image, is employed to override at least some pixel values in the convolution map. The resulting revised convolution map is employed to generate an enhanced representation of the electrical circuit. The enhanced representation may be, for example, a representation of contours associated with conductors on one side of the electrical circuit, or a binary representation of conductors located on one side of the electrical circuit.

Further in accordance with a preferred embodiment of the present invention the digital image is a red image, and the multiple image inputs are manipulated in a non-linear fashion to produce a "pseudo gray" representation of the electrical circuit having enhanced contrast between some, but not necessarily all, parts in the electrical circuit. At least some pixel values in the convolved red image are overridden by the pseudo gray representation to produce a revised convolution image. The revised convolution image is used to calculate an approximate sub-pixel location of transitions between regions having distinguishable optical characteristics. The approximate sub-pixel locations of transitions are employed to generate a contour representation or a binary representation of the electrical circuit.

There is thus provided in accordance with a preferred embodiment of the present invention a method of inspecting electrical circuits comprising: obtaining first image data relating to at least a part of an electrical circuit; obtaining second image data generally corresponding to the same part of the electrical circuit, wherein the second image data includes at least some image data that is different from the first image data; modifying the first image data by employing the second image data thereby to produce an enhanced representation of the electrical circuit; and inspecting the enhanced representation for defects in the electrical circuit.

Preferred embodiments of the invention include the preceding one or more of the following:

The first image data is in a first spectral range and the second image data includes at least some image data in a second spectral range.

Contrast is enhanced between at least some portions of the second image data, wherein the portions represent corresponding parts of the electrical circuit.

The contrast enhancing is non-linear.

The contrast enhancing includes redefining substrate portions which, in the second image data, do not overlay conductors as opaque substrate portions, thereby to generally eliminate any distinction between substrate portions which overlay conductors and substrate portions which do not.

The first image data is convolved with a function. Preferably the function is an approximation of a Laplacian of a Gaussian function, and the modifying the first image data is carried out following the convolving.

Determining approximate locations of transitions between image regions having distinguishable optical characteristics in the first image data, and removing undesired transitions in response to the second image.

The enhanced representation is a binary representation of the electrical circuit.

The enhanced representation is a representation of contours in the electrical circuit, wherein the contours indicate approximate locations of transitions between regions in the electrical circuit which exhibit distinguishable optical characteristics.

The enhanced representation has a spatial resolution that is greater than the spatial resolution of the first and second image data.

The enhanced representation has a gray scale whose dynamic range is less than the dynamic range of a gray scale of either the first or the second image data.

Determining in the first image data approximate locations of transitions between image regions having distinguishable optical characteristics, and overriding at least part of the convolved first image data.

The first and second images are acquired with at least one imager. Preferably the imager comprises at least two different types of optical detectors which are arranged to view at least a portion of the electrical circuit illuminated by the illuminator.

The first and second images are generally, but not necessarily exactly, spatially coincidental, and each of the first and second images is in a different spectral range.

There is thus provided in accordance with a preferred embodiment of the present invention a method of inspecting electrical circuits comprising: obtaining first image data relating to at least part of an electrical circuit in at least a first spectral range; obtaining second image data relating to at least part of an electrical circuit in at least a second spectral range; and providing an enhanced contrast representation of the electrical circuit by non-linearly combining the first image data and the second image data.

Preferred embodiments of the invention include the preceding and one or more of the following:

The part of the electrical circuit in the first and second images includes first conductors located on a first side of an electrical circuit substrate and second conductors located on a second side of an electrical circuit substrate. Preferably the enhanced contrast representation includes information providing enhanced contrast between representations of the first conductors and the electrical circuit substrate.

The enhanced contrast representation exhibits decreased artifacts resulting from a non-opaque characteristic of a substrate.

There is thus provided in accordance with another preferred embodiment of the present invention a method of inspecting electrical circuits formed on different surfaces of a non-opaque substrate comprising: obtaining image data relating to at least part of an electrical circuit, and enhancing the image data to provide enhanced inspection output information which decreases artifacts resulting from the non-opaque characteristic of the substrate.

Preferred embodiments of the invention include the preceding and one or more of the following:

The electrical circuits include first conductors on a first side of the substrate and second conductors on a second side of the substrate, and the artifacts include part of an image of a substrate portion which does not have either first or second conductors deposited thereon.

There is thus provided in accordance with a preferred embodiment of the present invention a method of inspecting electrical circuits comprising: obtaining first image data relating to at least part of an electrical circuit; obtaining second image data relating to at least part of an electrical circuit; and non-linearly combining the first image data and the second image data to form an enhanced image of the electrical circuit.

Preferred embodiments of the invention include the preceding and one or more of the following:

The non-linear combining provides a pseudo image

The pseudo-image is supplied to a high-sure/low-sure region classifier operative to classify portions of the image as regions that to a high degree of confidence are conductor and/or to classify portions of the image as regions that to a high degree of confidence are substrate.

The second image data includes image data relating to a plurality of visually distinguishable substrate portions, at least some of which overlay conductors, and at least some of which do not overlay conductors. Preferably portions that do not overly conductors are redefined in the second image data as substrate portions that overlay conductors.

The second image data includes image data that relates to a plurality of visually distinguishable substrate portions, at least some of which are opaque and some of which are non-opaque. Preferably, non-opaque substrate portions are redefined in the second image data as opaque substrate portions.

The high-sure/low-sure classifier operates on the pseudo image to produce a high-sure/low-sure image output including at least three regions as follows: (i) a low-sure region that to a high degree of confidence represents only substrate; (ii) a high-sure region that to a high degree of confidence represents only conductor located on the top surface of the electrical circuit; and (iii) a third region which is neither high-sure nor low-sure.

The high sure/low sure image is employed to selectively modify an interim image formed from the first image data to produce an enhanced representation of the electrical circuit.

The first image data is convolved with a mathematical function approximating a 2-dimensional Laplacian of a Gaussian function.

Determining in the first image data approximate locations of transitions between image regions having distinguishable optical characteristics.

The enhanced representation is a binary representation of the electrical circuit.

The enhanced representation is a representation of contours in the electrical circuit. Preferably the contours indicate approximate locations of transitions between regions in the electrical circuit which exhibit distinguishable optical characteristics.

The transitions between regions in the electrical circuit exhibiting distinguishable optical characteristics include transitions between substrate and conductors located on a top surface of the electrical circuit. Preferably, the transitions generally exclude transitions between substrate and other conductors in the electrical circuit.

Analyzing the enhanced representation of the electrical circuit to provide an indication of defects in the electrical circuit.

The first and second image data are acquired with at least two different types of optical detectors which are arranged to view at least a portion of the electrical circuit as illuminated an illuminator.

The first and second images of the electrical circuit are generally, but not necessarily exactly, spatially coincidental. Preferably each of the first and second images are in a different spectral range.

There is thus provided in accordance with another preferred embodiment of the present invention a system for inspecting electrical circuits comprising: a first image data acquisition assembly obtaining first image data relating to part of an electrical circuit: a second image data acquisition assembly obtaining second image data generally corresponding to the same part of the electrical circuit, wherein the second image data includes at least some image data that is different from the first image data; a first image data modifier modifying the first image data by employing the second image data to produce an enhanced representation of the electrical circuit; and a defect inspector, inspecting the enhanced representation for defects.

Preferred embodiments of the invention include the preceding and one or more of the following:

The first image data is in a first spectral range and second image data includes at least some image data in a second spectral range.

A contrast enhancer, enhancing contrast between at least some parts of the second image data which correspond to respective parts of the electrical circuit.

The contrast enhancer enhances contrast in a non-linear manner.

The contrast enhancer is operative to redefine substrate portions not overlaying conductors in the second image data as opaque substrate portions, and thereby generally eliminate any distinction between substrate portions which overlay conductors and substrate portions which do not.

A convolver, convolving the first image data with a function. Preferably the function is an approximation of a Laplacian of a Gaussian function, and modifier operates downstream of the convolver.

A transition locator, determining in the first image data approximate locations of transitions between image regions having distinguishable optical characteristics and wherein the modifier is operative to remove undesired transitions.

The enhanced representation is a binary representation of the electrical circuit.

The enhanced representation is a representation of contours in the electrical circuit. Preferably the contours indicate approximate locations of transitions between regions in the electrical circuit which exhibit distinguishable optical characteristics.

The enhanced representation has a spatial resolution that is greater than the spatial resolution of either the first or the second image data.

The enhanced representation has a gray scale whose dynamic range is reduced as compared with the dynamic range of a gray scale of either the first or the second image data.

A transition locator, determining in the first image data approximate locations of transitions between image regions having distinguishable optical characteristics and wherein the modifier is operative to override at least part of an output of the convolver.

The first and second data acquisition assemblies include at least one illuminator and at least one imager, and the imager comprises at least two different types of optical detectors. Preferably the image is arranged to view at least a portion of the electrical circuit illuminated by the illuminator.

The imager comprises three types of detectors each of which outputs a generally spatially coincidental image of the electrical circuit in a respective spectral range.

There is thus provided in accordance with another preferred embodiment of the present invention a system for inspecting electrical circuits comprising: a first image data acquisition assembly, obtaining first image data relating to at least part of an electrical circuit in at least a first spectral range; a second image data acquisition assembly obtaining second image data relating to at least part of an electrical circuit in at least a second spectral range; and an enhanced contrast representation generator providing an enhanced contrast representation of the electrical circuit by non-linearly combining the first image data and the second image data.

Preferred embodiments of the invention include the preceding and one or more of the following:

The at least part of an electrical circuit includes first conductors located on the first side of an electrical circuit substrate and second conductors located on the second side of the electrical circuit substrate, and the enhanced contrast representation includes information providing enhanced contrast between representations of the first conductors and the substrate.

The enhanced contrast representation exhibits decreased artifacts resulting from a non-opaque characteristic of the substrate.

There is thus provided in accordance with another preferred embodiment of the present invention a system for inspecting electrical circuits formed on different surfaces of a non-opaque substrate comprising: an image data acquisition assembly obtaining image data relating to at least part of an electrical circuit, and an image data enhancement assembly, enhancing the image data to provide enhanced inspection output information which decreases artifacts resulting from the non-opaque characteristic of the substrate.

Preferably, the electrical circuits have first conductors on a first side of the substrate and second conductors on a second side of the substrate, and the artifacts include images of the first and second conductors.

There is thus provided in accordance with another preferred embodiment of the present invention a system for inspecting electrical circuits comprising: a first image data acquisition assembly, obtaining first image data relating to at least part of an electrical circuit; a second image data acquisition assembly obtaining second image data relating to at least part of an electrical circuit; and a pseudo-image generator non-linearly combining the first image data and the second image data, the pseudo-image generator being operative to supply a pseudo-image of the part of the electrical circuit constructed from the first and second image data to a high-sure/low-sure region classifier.

Preferred embodiments of the invention include the preceding and one or more of the following:

The second image data includes image data relating to a plurality of visually distinguishable substrate portions. At least some of the substrate portions overlay conductors and the pseudo image generator redefines substrate portions not overlaying conductors in the second image data as substrate portions that overlaying conductors.

The second image data includes image data relating to a plurality of visually distinguishable substrate portions. At least some substrate portions are opaque, and the pseudo image generator redefines non-opaque substrate portions in the second image data as opaque substrate portions.

The high-sure/low-sure classifier operates on the pseudo image to produce a high-sure/low-sure image output which includes at least three regions as follows: (i) a low-sure region that to a high degree of confidence represents only substrate; (ii) a high-sure region that to a high degree of confidence represents only conductor located on the top surface of the electrical circuit; and (iii) a third region which is neither high-sure nor low-sure.

A representation generator receiving the first image data, wherein the representation generator includes an override circuit in communication with the high-sure/low-sure classifier and is operative to employ the high sure/low sure image to selectively modify image data to produce an enhanced representation of the electrical circuit.

The representation generator is operative to process the first image data.

A convolver operative to convolve the first image data with a mathematical function approximating a dimensional Laplacian of a Gaussian function.

A transition locator operative to determine in the first image data approximate locations of transitions between image regions having distinguishable optical characteristics.

The enhanced representation is a binary representation of the electrical circuit.

The enhanced representation is a representation of contours in the electrical circuit. Preferably the contours indicate approximate locations of transitions between regions in the electrical circuit which exhibit distinguishable optical characteristics.

The transitions between regions in the electrical circuit which exhibit distinguishable optical characteristics include transitions between substrate and conductors located on a top surface of the electrical circuit. Transitions between substrate and other conductors in the electrical circuit preferably are not included.

A defect processor receiving the enhanced representation and operative to analyze the enhanced representation to provide an indication of defects in the electrical circuit.

The first and second data acquisition assemblies include at least one illuminator and at least one imager, wherein the imager includes at least two different types of optical detectors which are arranged to view a portion of the electrical circuit illuminated by the illuminator.

The imager comprises three types of detectors, each of which is operative to output a generally, but not necessarily exactly, spatially coincidental image of the electrical circuit in a respective spectral range.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1:
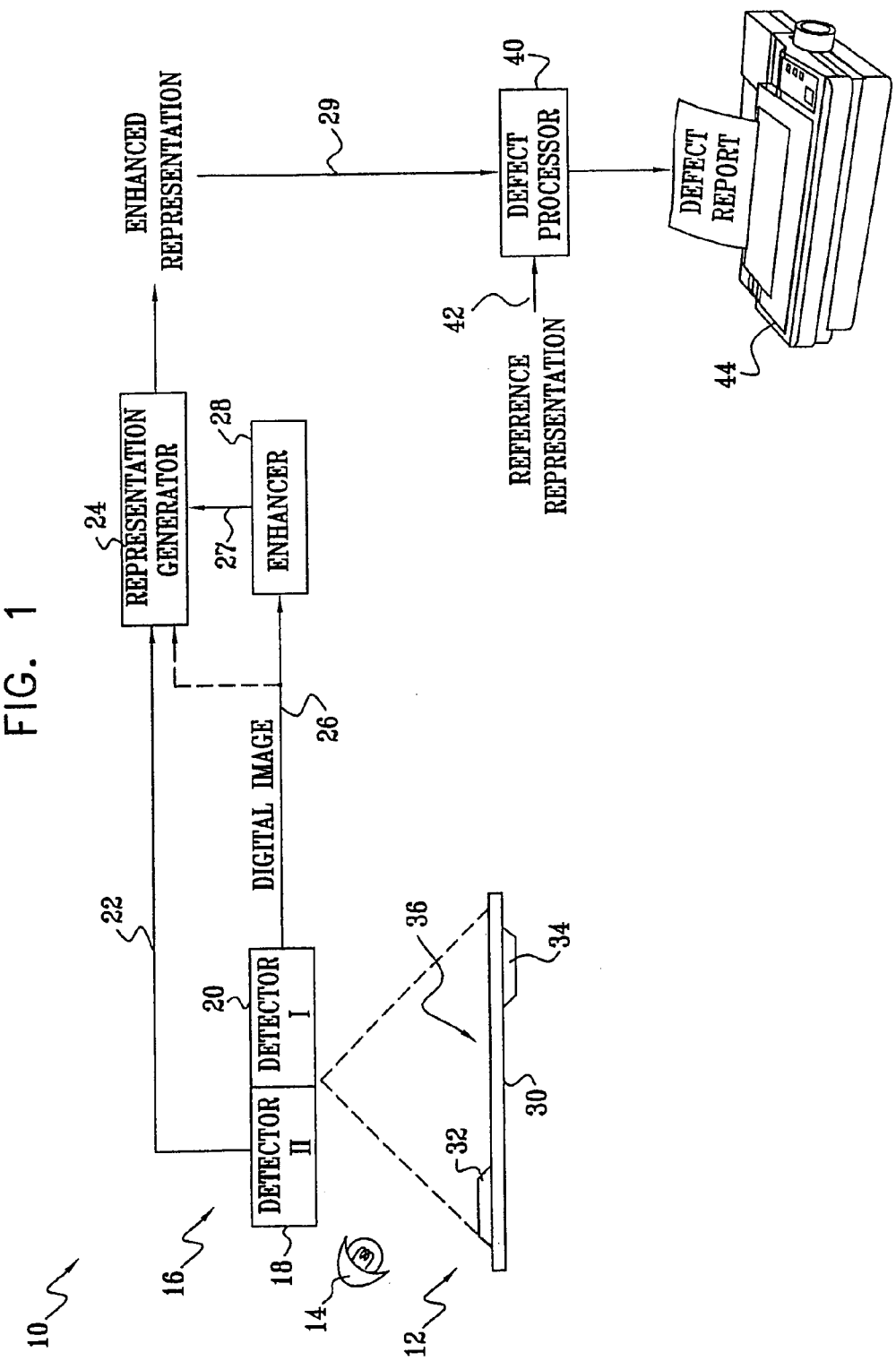
FIG. 1 is a simplified block diagram of a system for automatic inspection of objects, such as electrical circuits, in accordance with a preferred embodiment of the present invention.

Reference is now made to FIG. 1 which is a simplified block diagram of a system 10 for inspecting objects, such as electrical circuits 12, in accordance with a preferred embodiment of the present invention. Electrical circuits 12 that may be inspected by system 10 typically include printed circuit boards, ball grid array substrates, bump arrays, flat panel displays, semiconductor devices and other suitable electrical circuits.

As seen in FIG. 1, system 10 preferably includes an illuminator 14 and an imager 16, typically comprising at least two different types of optical detectors, indicated by reference numerals 18 and 20. Imager 16 views a portion of electrical circuit 12 illuminated by illuminator 14. In accordance with a preferred embodiment of the invention, imager 16 includes three types of detectors, only two being shown for the sake of simplicity, such as R, G and B (red, green and blue) detectors each of which is operative to output a generally spatially coincidental image of electrical circuit 12 in its respective spectral range. System 10 preferably is operative in a scanning arrangement in which electrical circuit 12 and imager 16 are displaced with respect to each other during image acquisition, as known in the art. Alternatively system 10 may be operative as a staring array system.

Each of detectors 18 and 20 preferably outputs generally coincidental optical data corresponding to electrical circuit 12, such as a digital image thereof. As seen in FIG. 1, a digital image output 22 of detector 18, preferably a red detector, is provided to a representation generator 24, and a digital image output 26 of detector 20 is provided to an enhancer 28. It is noted that the digital output 26 may be from a single detector, as seen in FIG. 1, or from multiple detectors as described hereinbelow in greater detail.

Preferably representation generator 24 outputs an enhanced digital representation 29 of electrical circuit 12 having a spatial resolution that is greater than the spatial resolution of the digital image outputs 22 and 26. Preferably, representation 29 of electrical circuit 12 exhibits a gray scale whose dynamic range is reduced as compared with the dynamic range of the gray scale of the digital image output 22. For example, the representation 29 produced by representation generator 24 preferably comprises a binary representation of electrical circuit 12 or a representation of contours in electrical circuit 12. Contours indicate approximate locations of transitions between regions in electrical circuit 12 exhibiting distinguishable visible characteristics. Such characteristics may include, for example, the intensities of reflection of such regions when exposed to illumination from illuminator 14. It is appreciated that elements forming contours may or may not be represented by a data structure that is larger or smaller than the data structure employed to represent gray scale pixels in digital output 22.

In the electrical circuit 12 as seen in FIG. 1, regions exhibiting distinguishable visible characteristics include a non-opaque substrate 30, conductors 32 on a top side of substrate 30, conductors 34 on a bottom side of substrate 30 and portions 36 of substrate 30 having thereon neither of conductors 32 nor 34.

In a preferred embodiment of the invention, enhancer 28 processes digital image output 26 to form an enhanced contrast representation 27 of electrical circuit 12 that is characterized by synthetically enhanced contrast between predetermined portions of electrical circuit 12, such as between conductors 32 and substrate 30. A preferred method of enhancing contrast includes redefining substrate portions 36 in the digital image output 26 as opaque substrate portions, such as substrate portions overlaying conductors 34 in an image of electrical circuit 12. Such redefinition thus generally eliminates any distinction between substrate portions which overlay conductors 34 and substrate portions 36 which do not. The enhanced contrast representation output of enhancer 28 preferably is employed in representation generator 24 to override or to select portions of digital image output 22, or portions of a result of an intermediate stage of processing digital image output 22, in the course of generation of enhanced representation 29. Alternatively, enhancer 28 may be obviated and the digital image output 26 may be supplied directly as an input to representation generator 24.

It may thus be appreciated that enhanced representation 29 is generated from at least two optical inputs, here digital image inputs 22 and the output 27 of enhancer 28, each containing generally spatially coincident but different image data, wherein one of the image inputs controls the other input. Preferably the use of enhanced representation 29 in accordance with a preferred embodiment of the present invention improves defect detection capabilities in an automated optical inspection system compared to conventional automated inspection systems.

As seen in FIG. 1, enhanced representation 29 preferably is supplied to a defect processor 40, which also receives a reference representation 42. Typically reference representation 42 is obtained from the inspection of a non-defective electrical circuit. or is derived from a CAM data file such as may be obtained from a Genesis™ CAM system (not shown), commercially available from Frontline Solutions Ltd. of Yavne, Israel. Preferably processor 40 analyzes enhanced representation 29 with reference to one or more design rules governing acceptable design parameters of the electrical circuit, the reference representation 42, and a gray scale image output of one of detectors 18 and 20 in order to detect defects in electrical circuit 12. Defect processor 40 preferably outputs a defect report 44 indicating the presence of defects that are detected on electrical circuit 12.

It is appreciated that enhanced representation 29 may be a binary representation of electrical circuit 12, a contour representation thereof or a representation in another suitable format as required by defect processor 40. A suitable defect processor 40 including a defect detection module operative to detect defects in binary representations of electrical circuits is found in Inspire™ 9060 automated optical inspection systems and a suitable defect processor including a defect detection module operative to detect defects in contour representations of electrical circuits is found in ICP 8060 automated optical inspections systems, both of which systems are available from Orbotech Ltd. of Yavne, Israel.

Figure 2:
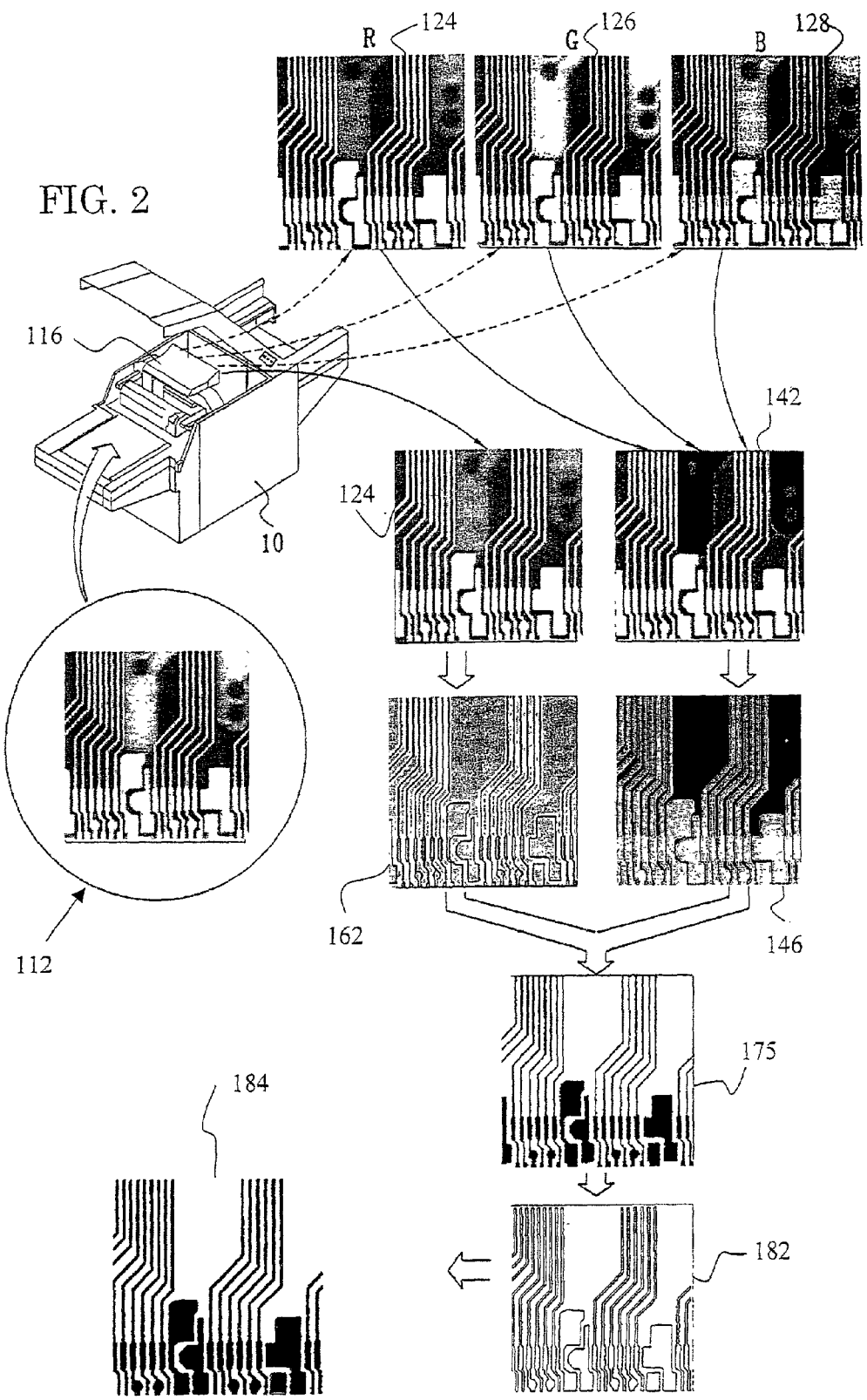
FIG. 2 is a simplified diagrammatic illustration of methodology for generating an enhanced representation of electrical circuits in accordance with a preferred embodiment of the present invention.
Figure 3:
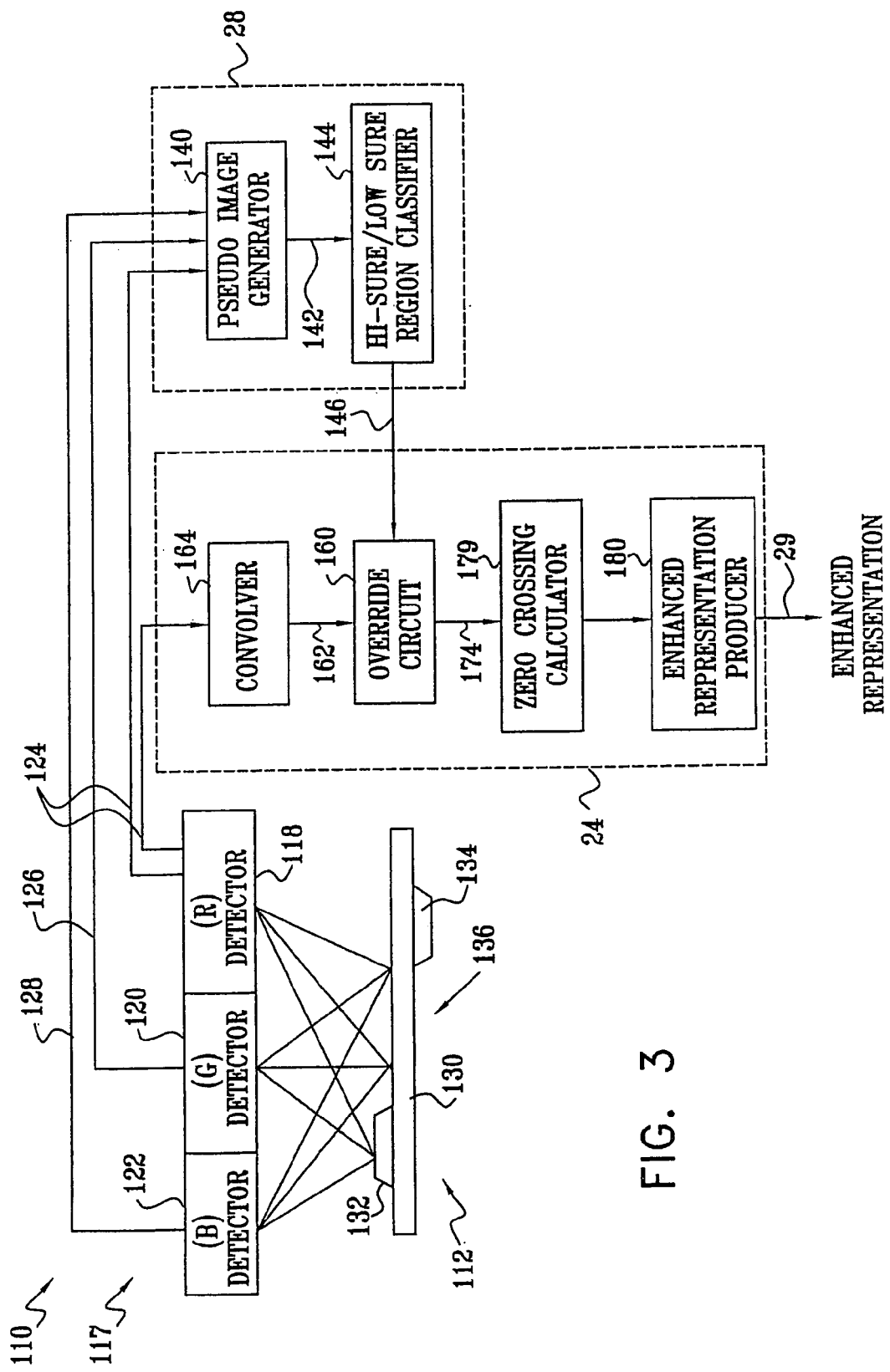
FIG. 3 is a simplified functional block diagram of apparatus for generating an enhanced representation of electrical circuits useful for performing the methodology of FIG. 2.
Figure 4:
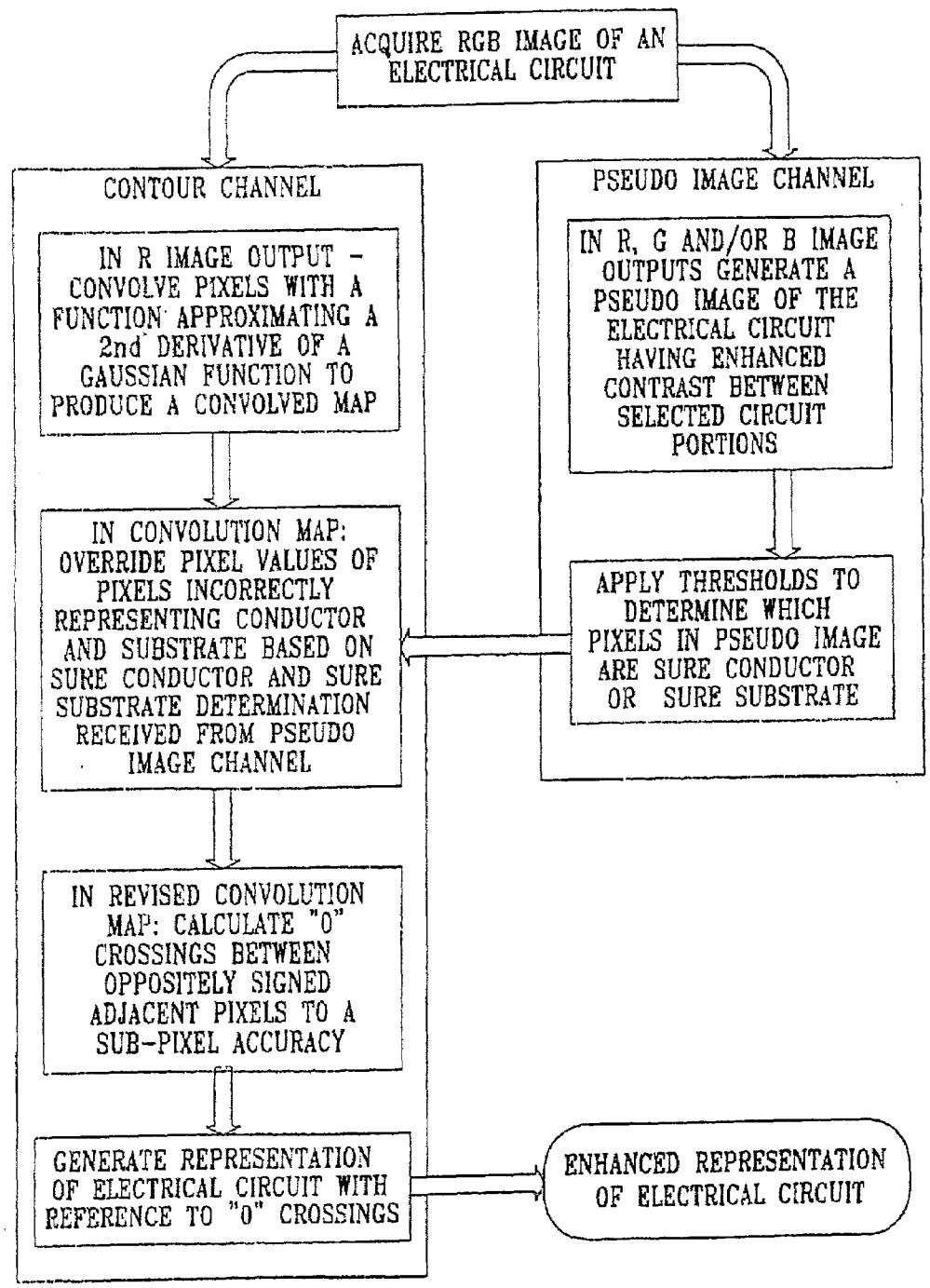
FIG. 4 is a simplified flow chart illustration showing a method of generating an enhanced representation of electrical circuits in accordance with the methodology of FIG. 2.

Reference is now made to FIG. 2 which is a simplified diagrammatic illustration of methodology for generating an enhanced representation 29 (FIG. 1) of an electrical circuit in accordance with a preferred embodiment of the present invention, to FIG. 3 which is a simplified functional block diagram of apparatus generating a suitable enhanced representation 29 useful for performing the methodology of FIG. 2, and to FIG. 4 which is a simplified flow chart showing a method of generating the suitable enhanced representation 29 in accordance with the methodology of FIG. 2.

FIG. 2 illustrates methodology for inspecting an electrical circuit 112 employing a color automated optical inspection system 110, such as is found in an Inspire™ 9060 automated optical inspection system available from Orbotech, Ltd. of Israel. System 110 is characterized in that it contains an imager assembly 116 containing at least one and preferably three RGB (Red, Green & Blue) detector assemblies 117 (FIG. 3), each of which is capable of providing optical data relating to electrical circuit 112 in multiple channels, such as Red, Green and Blue color channels in RGB color space. It is appreciated that each detector assembly 117 incorporates a plurality of detectors each of which preferably provides optical data, such as images, relating to electrical circuit 112 in a different portion of the electromagnetic spectrum. It is further appreciated that one or more of the detectors may detect image data in a non-visible portion of the electromagnetic spectrum, such as x-ray, non-visible UV and IR.

Figure 5A:
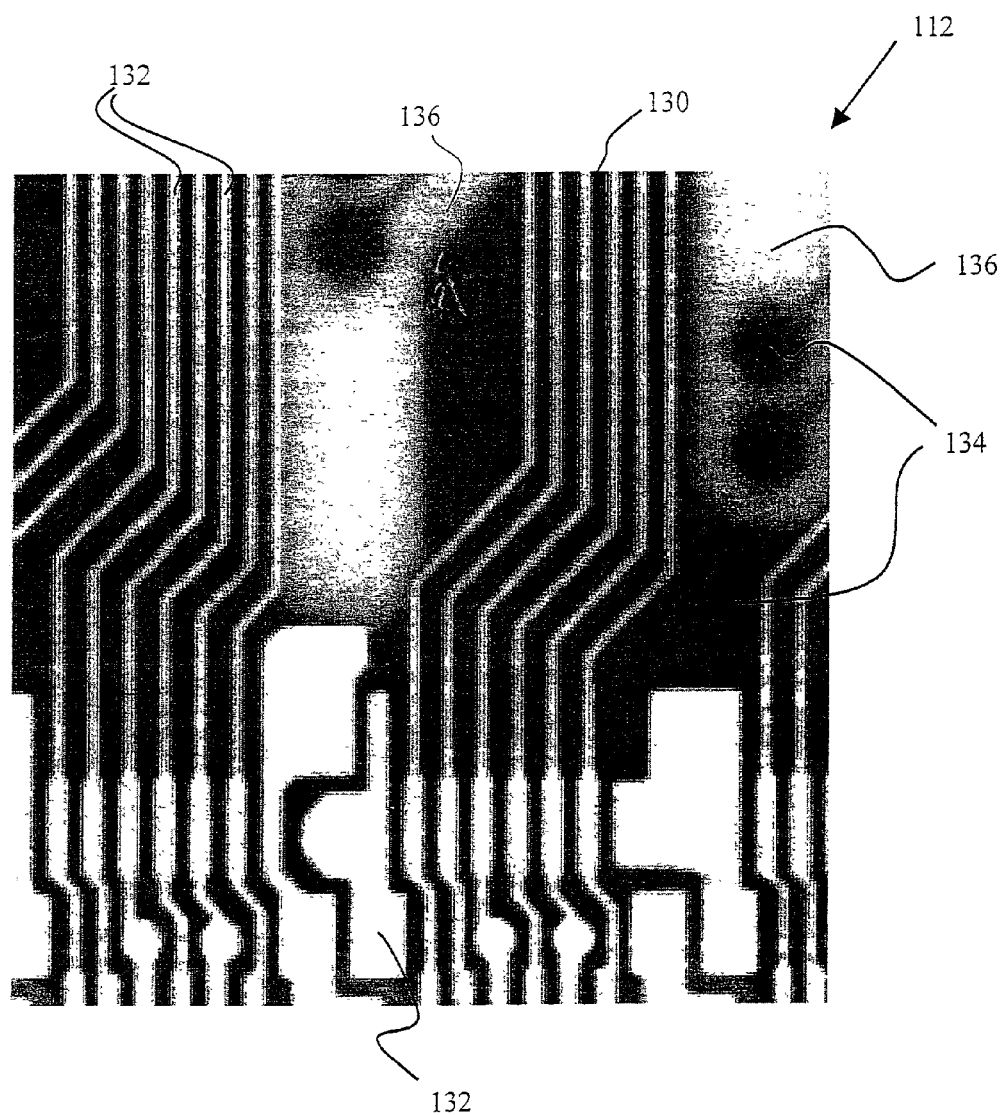
FIGS. 5A, 5B, 5C, 5D, 5E, 5F, 5G, 5H, 5I and 5J are images of a portion of an electrical circuit employed at various stages of the methodology of FIGS. 2–4.

Initially image data preferably is acquired in parallel by three detectors 118, 120 and 122 (FIG. 3), preferably providing R, G and B image data respectively. Typically electrical circuit 112 appears as seen in FIG. 5A. R, G, and B images typically produced by respective R, G and B detectors 118, 120 and 122, are designated by reference numerals 124, 126 and 128 in FIG. 2 and are shown in enlarged form in FIGS. 5B, 5C and 5D respectively.

In the embodiment of FIGS. 2–4, electrical circuit 112 is formed on a non-opaque substrate 130 typically of a type used in printed circuit board fabrication processes employing double sided treated foils (DSTF). FIG. 5A illustrates, in black and white, the electrical circuit 112 as it would be seen by the human eye. It is noted that system 110 may or may not employ such an image, in black and white or color, for inspection of the electrical circuit 112.

Referring to FIG. 5A, it is noted that due to the non-opacity of some types of substrate 130, such as substrates used in DSTF processes, there are seen not only the electrical circuit conductors 132 on a top surface of the circuit but also electrical circuit conductors 134 on one or more other surfaces of the circuit, and substrate portions 136 that are not overlaying conductors 134. In order to perform proper inspection of the conductors 132 on the top surface of the circuit 112, it is necessary to diminish, or eliminate data relating to substrate portions 136 not overlaying conductors 134, which may be viewed by detectors 118, 120 and 122, in order to clearly distinguish between data relating to conductors 132 on the top surface of the circuit and substrate portions 136. It is appreciated that in other electrical circuits (not shown) it may be necessary to diminish, or eliminate, data relating to conductors 134 in order to clearly distinguish between data relating to conductors 132 and conductors 134.

Figure 5B:
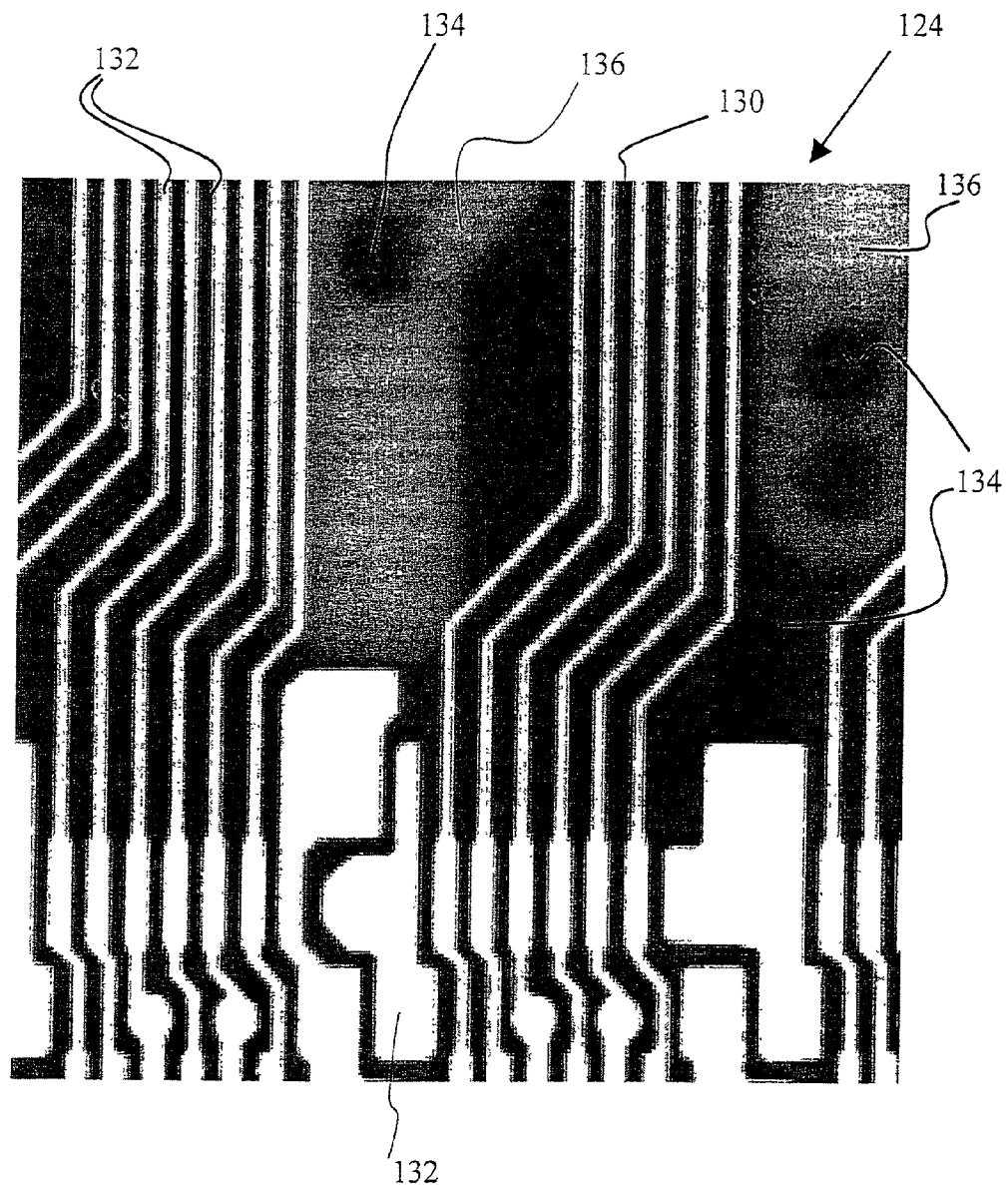
Figure 5C:
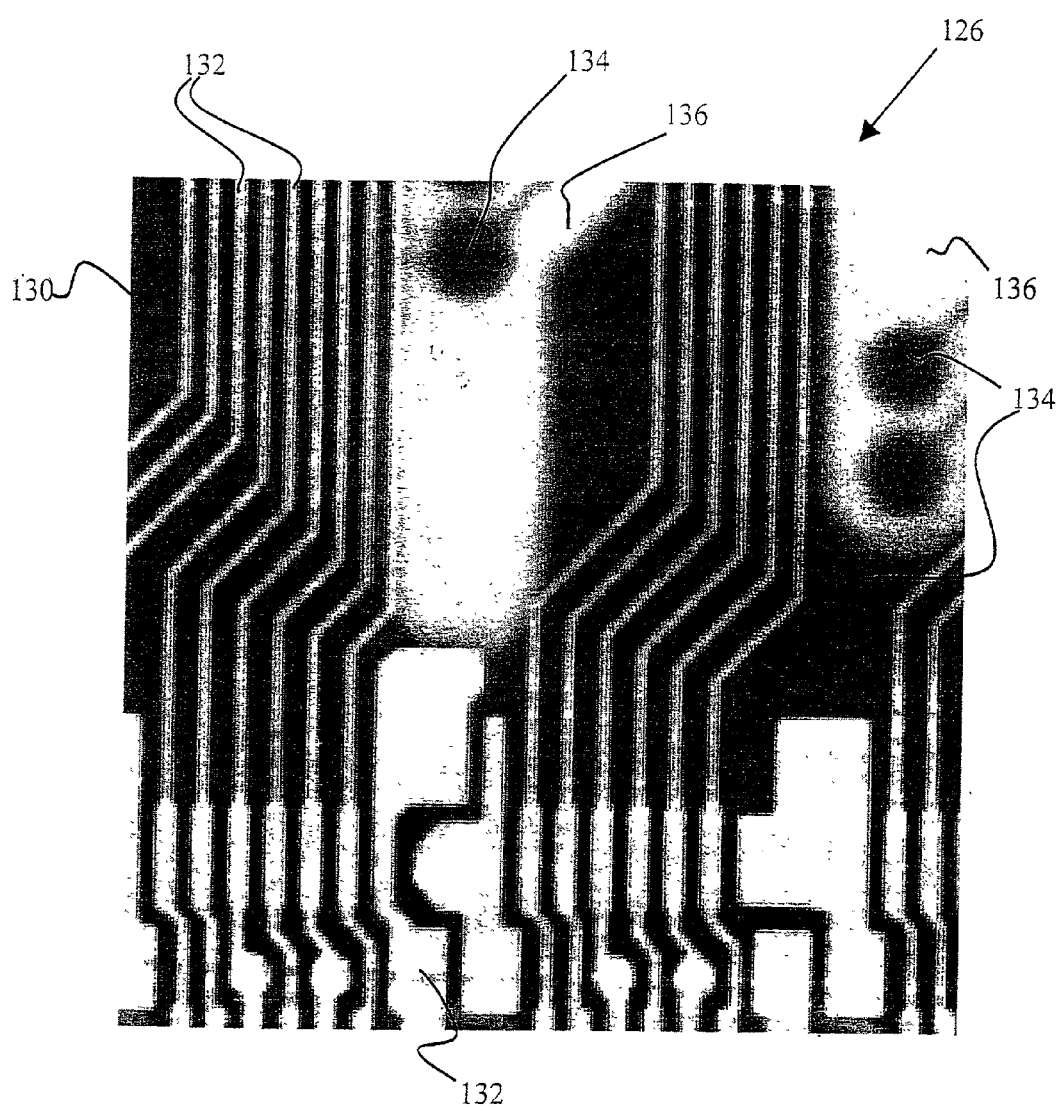
Figure 5D:
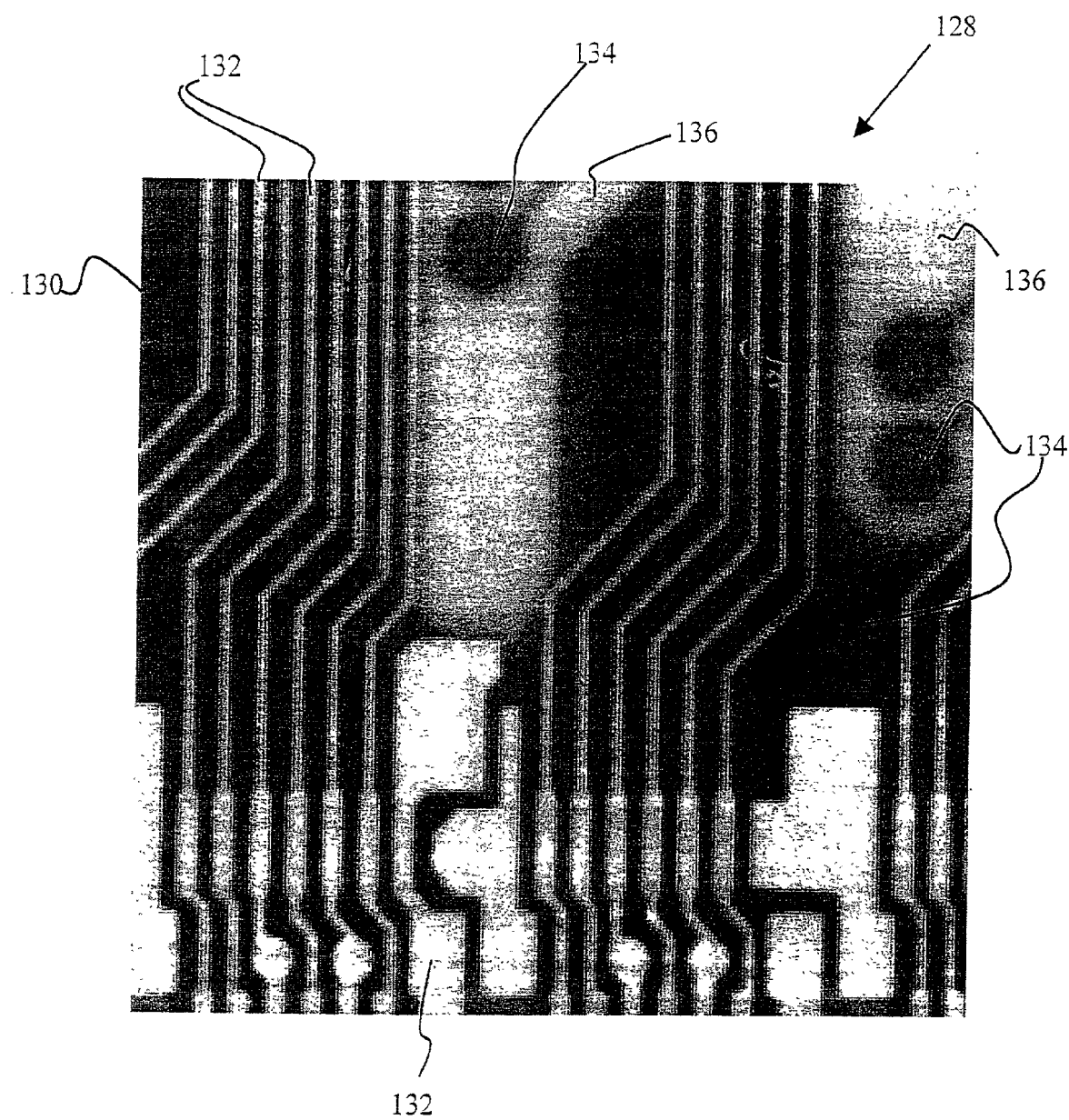

Turning to FIGS. 5B, 5C and 5D, corresponding to images 124, 126 and 128 in FIG. 1, it is seen that the Red, Green and Blue monochrome images of the electrical circuit each contain image data from conductors on various surfaces of the electrical circuit, but with differing contrast relationships between the substrate 130, respective conductors 132 and 134, and portions 136 not overlaying conductors 134.

Figure 5E:
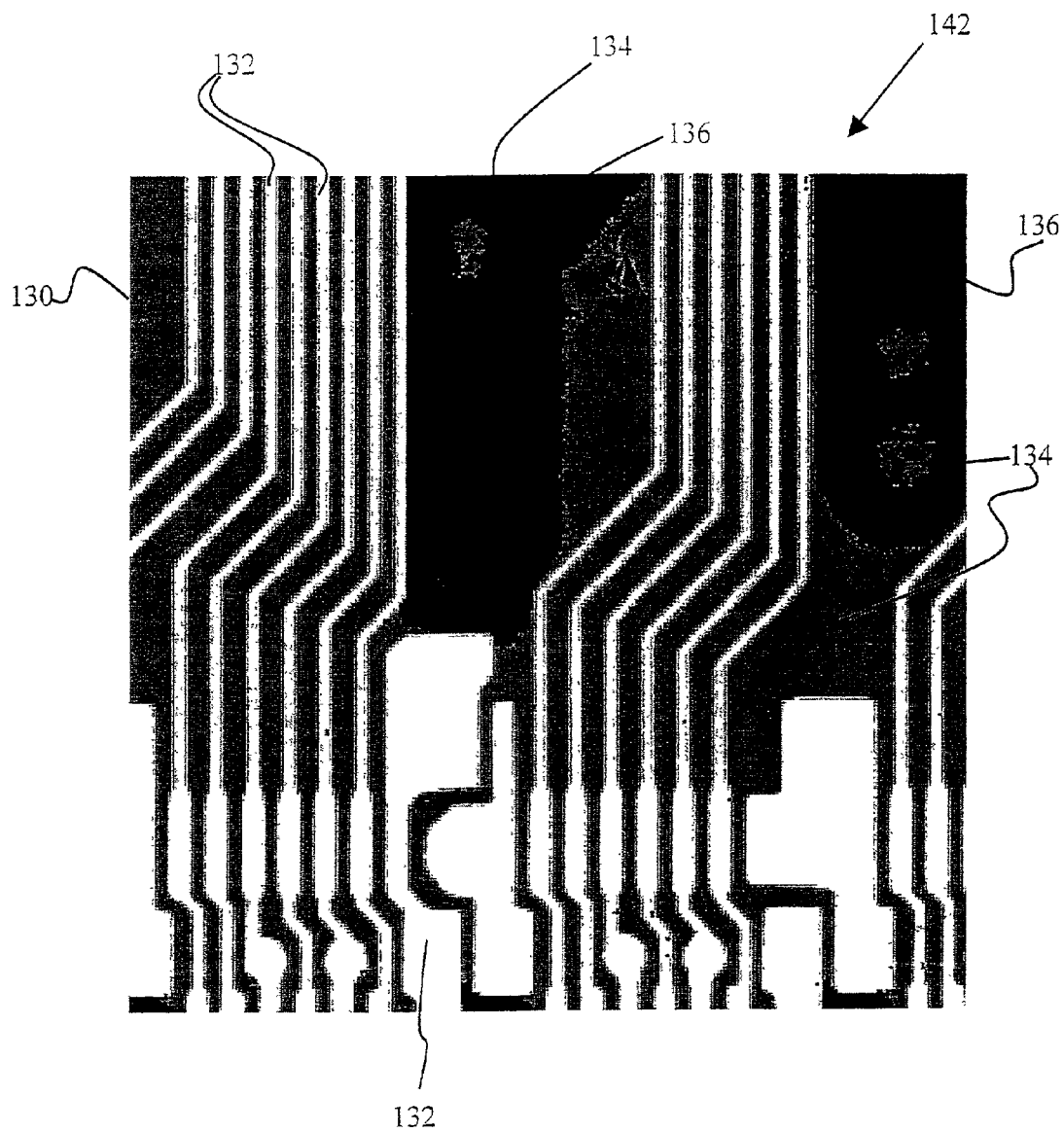

It is a particular feature of the present invention that a suitably weighted combination of the R, G and B image data provides enhanced contrast between image data relating to conductors 132 appearing on the top surface of the electrical circuit, other conductors 134 and the substrate 130, in the example seen in FIGS. 5A–5D, particularly substrate portions 136 not overlaying conductors 134. Preferably, a non-linear transform of pixel values is performed on the weighted, contrast enhanced, image data to further enhance contrast between conductors 132 on a first side of substrate 130 with respect to substrate portions overlaying conductors 134 and substrate portions 136 not overlaying conductors 134, and thereby to clearly distinguish between conductors 132 and all other parts of electrical circuit 112 (FIG. 3). Suitable weighting of the R, G and B image data may include negative weighting factors applied to image data outputs from one or more of the R, G or B detectors, or selectable weighting factors applied as a function of various intensity characteristics of pixels in the outputs of one or more of the R, G, or B detectors. A result from suitably weighting R, G and B image data is shown in FIG. 5E.

As shown in FIG. 3, all three of the image data outputs of detectors 118, 120 and 122 preferably are provided to a pseudo-image generator 140. In pseudo-image generator 140 the image data outputs of detectors 118, 120 and 122 are combined with a desired relative weighting, and the values of selected pixels are transformed, to produce a synthesized image, an example of which is seen in FIG. 5E. This synthesized image is termed a "pseudo-image" and is designated in FIG. 2 by reference numeral 142.

In accordance with a preferred embodiment of the invention, in the operation of the pseudo-image generator 140, weighting coefficients are heuristically assigned on the basis of empirical analysis of one or more typical electrical circuits to be inspected in order to suitably enhance contrast between various portions of interest in an electrical circuit being inspected. For example, if it is desired to distinguish between conductors 132 and substrate portions 136 not overlaying conductors 134, so that in pseudo-image 142 conductors 132 are contrast enhanced and readily distinguishable from all other portions of electrical circuit 112, a color image of an electrical circuit 112 to be rested may be analyzed in order to suitably characterize substrate portions 136 and to assign contrast enhancing weighting coefficients. Preferably threshold values are also determined to so that the values of pixels in the contrast enhanced image of electrical circuit 112 that exceed (or that do not exceed) the threshold are transformed such that in the pseudo-image 142, substrate portions 136 artificially appear as if they are opaque, such as substrate portions that overlay conductors 134. It is appreciated that such a non-linear transform further enhances the contrast of, and distinguishes, conductors 132 with respect to other parts of electrical circuit 112.

The empirical analysis employed for determining weighting may indicate, for example as seen in FIGS. 5B, 5C and 5D, that:

a) conductors 132 and substrate portions 136 not overlaying conductors 134 both exhibit an intensity level that is greater than that of substrate portions overlaying conductors 134 in each of the R, G and B outputs 124, 126 and 128 respectively;

b) substrate portions 136 generally exhibit a lower intensity level than the intensity level of conductors 132 in the R output 124;

c) substrate portions 136 generally exhibit a higher intensity level than that of conductors 132 in the G output 126; and d) substrate portions 136 generally exhibit the same intensity level as that of conductors 132 in the B output 128.

If it is desired to de-emphasize substrate portions 136 as compared to substrate portions overlaying conductors 134, so as to enhance the contrast between conductors 132 on the one hand and all portions of substrate 130 on the other hand, it can be seen that the G output should be given a relatively low weighting, or even a negative weighting as compared to the R and B outputs and that the B output should be given a relatively low weighting as compared to the R output.

In accordance with a preferred embodiment of the invention, R, G and B outputs from detectors 118, 120 and 122 respectively are assigned suitable weightings based upon the above-described analysis, and their composite value is evaluated with reference to a threshold as follows:

$$(a \times \text{Red}) + (b \times \text{Green}) + (c \times \text{Blue}) > d$$

where "a" is a weighting coefficient assigned to pixels in the Red output, "b" is a weighting coefficient assigned to pixels in the Green output, "c" is a weighting coefficient assigned to pixels in the Blue output and "d" is a threshold value that the composite of the weighted values for R, G and B must exceed in order for a pixel to be considered not to represent substrate. Thus when suitable weightings are applied to a digital image, with reference to FIGS. 5B–5D, the weighted values of pixels representing substrate portions 136 not overlaying conductors 134 do not exceed the threshold and therefore their values are transformed, preferably non-linearly, in the pseudo-image so that they correspond to pixels representing an opaque substrate, such as substrate portions overlaying conductors 134, while the weighted values of pixels representing substrate portions overlaying conductors 134 and conductors 132 exceed the threshold and therefore are not transformed.

Another suitable method of enhancing contrast between conductors 132 and other parts of the electrical circuit 112 involves comparing weighted image input values obtained from different image outputs and deciding how to represent pixels based on the results of such comparison. For example, if the G value of a pixel in a digital image of electrical circuit 112 exceeds a suitably weighted value for Red (a×Red) of that pixel, then the pixel value of that pixel in the pseudo-image 142 is transformed, preferably non-linearly, to provide contrast with conductors 132. Preferably, such a transformed pixel receives a "0" value representing an opaque substrate, or a value similar to a pixel representing substrate overlaying conductor 134, although in actuality it represents, for example, a substrate portion 136. If the value of the pixel does not exceed the weighted value for Red, its value is not transformed. A suitable value for the coefficient "a" typically is selected heuristically and, depending on color populations present in an electrical circuit under inspection, may be in the range, for example, 1.2–1.5.

Another suitable contrast enhancing and conductor distinguishing method may employ other logic applied to respective pixel values in a digital image of electrical circuit 112. For example, the value of pixels meeting either of the following conditions may be transformed in the psuedo-image 142 to suitably contrast pixels representing conductors 132, such as with a "0" value, a value that corresponds to an opaque substrate or another value that corresponds to substrate overlaying conductors 134:

a) Green is greater than (a×Red) AND Green is less than "e" AND Red is less than "e*"; OR b) Green is greater than (f×Red) AND Green is greater than "e"

where "a" is a weighting coefficient assigned to pixels in the Red output; "e" and "e*" are threshold values for a pixel intensity value of the Red and Green image outputs respectively; and "f" is another weighting coefficient assigned to pixels in the Red image output. Each of "a", "e" "e*" and "f" are selected preferably based on a heuristic analysis of the electrical circuit so as to produce a desired contrast enhancement. A suitable value for the coefficient "a" may be in the range of, for example, 0.7–1.2. A suitable value for the "f" coefficient may be in the range of, for example, 0.9–1.5. Suitable values for "e" and "e*" respectively maybe in the range of, for example, 175–225 on a scale of 256 for possible intensity values.

Weighted pixels meeting either of the above conditions may be, for example, pixels representing regions of substrate 136 of a non-opaque substrate 130. The values of such pixels are transformed in the psuedo-mage 142 so as to contrast pixels representing conductors 132 by assigning a synthetic value such as "0", a value representative of an opaque substrate, or a value representative of a substrate portion that does overlay conductors 134. Pixels meeting neither of the conditions, for example pixels representing conductors 132 on the top side of electrical circuit 112, or pixels representing substrate portions overlaying conductors 134, preferably are not transformed in the psuedo-image 142 and retain, for example, their actual R image output value.

It is appreciated that the above analyses may be performed on a regional, pixel by pixel or other suitable basis, and may be performed in software and/or hardware and/or by using suitable look-up tables, as appropriate.

Thus, it is appreciated that generation of a contrast enhanced image, such as the pseudo-image of FIG. 5E, preferably results from the following steps:

obtaining first image data relating to at least part of an electrical circuit in at least a first spectral range;

obtaining second image data relating to at least part of an electrical circuit in at least a second spectral range;

optionally, obtaining third image data relating to at least part of an electrical circuit in at least a third spectral range, and combining information from the first image data, the second image data, and optionally the third image data, optionally with predetermined weightings, and transforming the values of at least some pixels in a non-linear manner, to provide combined image data containing enhanced contrast inspection output information.

Figure 5F:
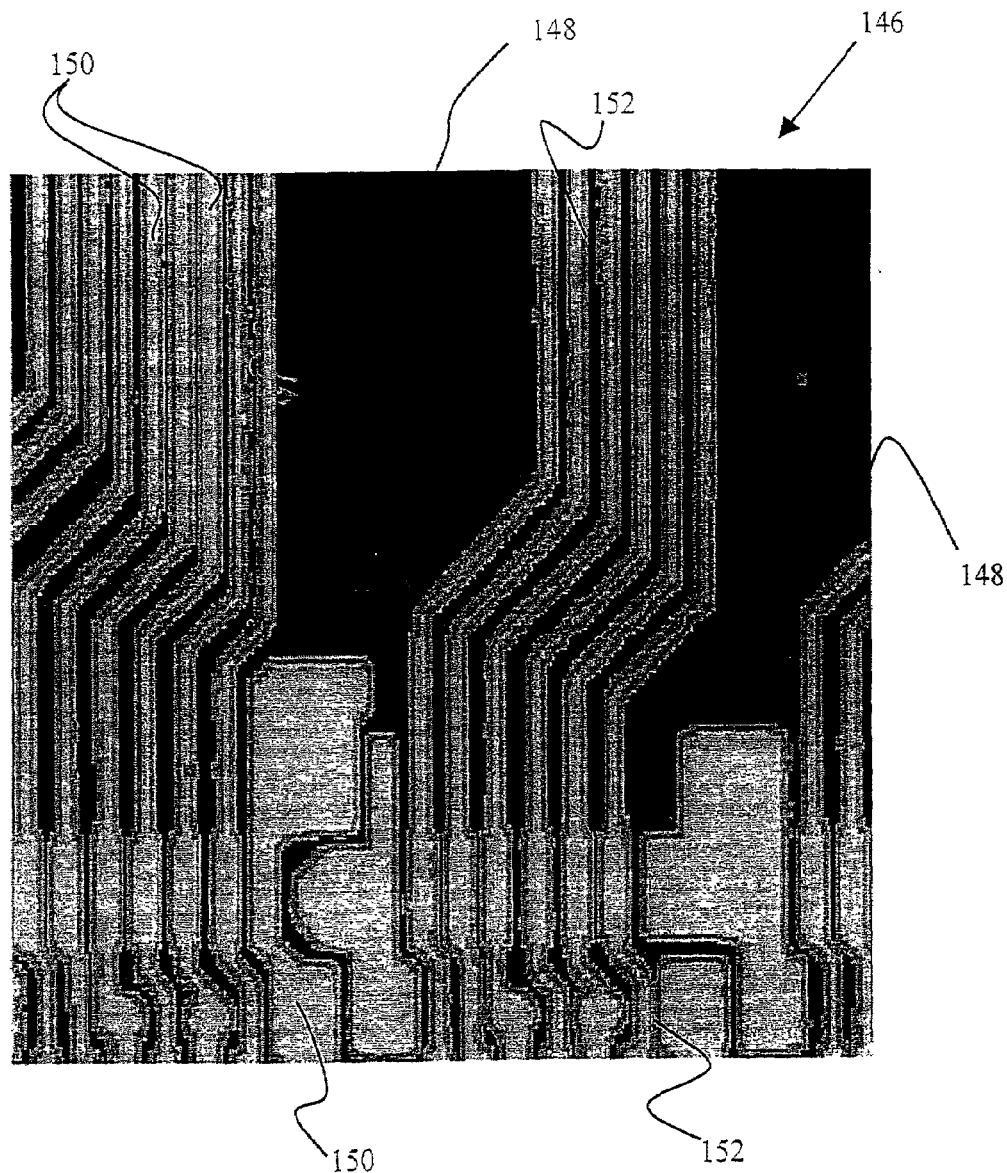

Returning now additionally to FIG. 3, it is seen that the output of pseudo-image generator 140, typically pseudo-image 142 (seen in greater detail in FIG. 5E), is provided to a high-sure/low-sure region classifier 144. Pseudo-image generator 140 and high-sure/low-sure classifier typically are included in enhancer 28 (FIG. 1) and high-sure/low-sure classifier 144 operates on the pseudo image 142 to produce a high-sure/low-sure image output 146, which is seen in greater detail in FIG. 5F. Referring to FIG. 5F, it is seen that the high-sure/low-sure image output 146 includes three regions: (i) a low-sure region 148, which is a region that to a high degree of confidence represents only substrate 130 (FIG. 3), including both substrate portions 136 and substrate portions that overlay conductors 134, (ii) a high-sure region 150, which is a region that to a high degree of confidence represents only conductors 132 located on the top surface of an electrical circuit 112, and (iii) a third region 152 which is neither high-sure nor low-sure.

In accordance with a preferred embodiment of the invention, classification of pixels in the pseudo-image 142 as belonging to one of regions 148, 150 and 152 is performed in classifier 144 by thresholding. Preferably a suitable threshold value is chosen which is determined heuristically, preferably as a function of R intensities characteristic of a particular electrical circuit to be inspected. In accordance with a preferred embodiment of the invention, in order for a pixel in an image to be deemed high-sure, namely belonging to region 150, the value of the pixel and each of its eight immediately surrounding pixel neighbors must exceed the threshold value. If the value of the pixel and each of its eight immediately surrounding pixel neighbors is less than the threshold value, then the pixel is deemed low-sure, namely belonging to region 148. AU other pixels are deemed to belong to region 152.

It is noted that in accordance with a preferred embodiment of the invention, a single threshold value may be used to distinguish between high-sure pixels 150 and low-sure pixels 148, or separate threshold values may applied to the determination of high-sure pixels 150 or low-sure pixels 148 respectively. If separate thresholds are used to determine if a pixel is high-sure or low-sure, and a pixel meets the threshold test to be deemed a high sure pixel 150, and additionally meets the threshold test to be deemed a low sure pixel 148, then preferably the pixel is deemed to be a low sure pixel 148.

The functions of pseudo image generator 140 and high-sure/low sure region classifier 144 preferably are performed in enhancer 28 (FIG. 1), and the high-sure/low sure image output 146, which is an enhanced contrast image, is provided to an override circuit 160 which preferably is part of representation generator 24.

Figure 5G:
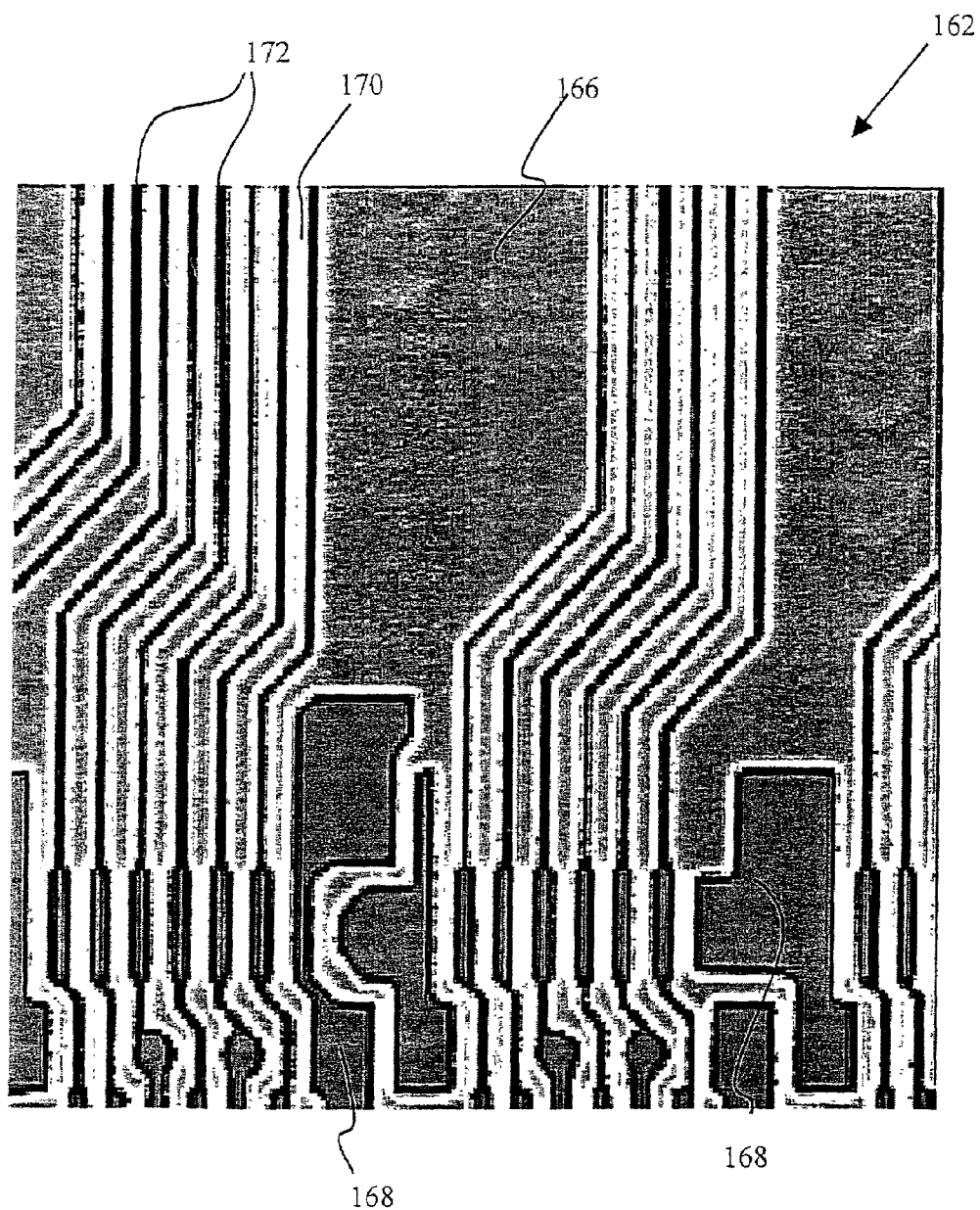

As seen in FIG. 3 override circuit 160 preferably receives a first input 162 from a convolver 164 which receives monochrome image data from imager assembly 117, preferably but not necessarily an R image output 124. Convolver 164 carries out a two-dimensional convolution on the monochrome image data, which preferably is operative to mathematically modify the values of pixels in the image output 124 and to produce a convolved image output, an example of which is shown in FIG. 5G, which constitutes first input 162.

In accordance with a preferred embodiment of the invention, in convolver 164 a convolution value is calculated for each pixel in the R image output 124 by convolving the pixels in the R image output 124, each of which has a value which is a function of the intensity of reflected light at that pixel, with a 2-dimensional Laplacian of a Gaussian function, or with an approximation thereof. Preferably the convolution of pixels in R image output 124 with an approximation of the Laplacian is performed using a Difference of Gaussians (DOG) methodology, substantially as described in U.S. Pat. No. 5,774,572, the disclosure of which is hereby incorporated herein.

In accordance with the DOG methodology, the convolution with an approximation of a 2-dimensional Laplacian of a Gaussian function preferably is performed by first calculating a value for the convolution of a 5×5 array of pixels with a 2-dimensional approximation of a Gaussian function. Subsequently, the value of the central pixel of the 5×5 array is subtracted from the convolution result calculated for the convolution of the entire 5×5 array with the 2-dimensional approximation of a Gaussian function. It is appreciated that the value of the central pixel corresponds to a convolution with a 1×1 Gaussian function. The result of the subtraction is the convolution value for the central pixel of the 5×5 array of pixels. In a preferred embodiment of the invention, the value for the convolution of the 5×5 array with a Gaussian function is calculated using a repeated boxcar function applied two dimensionally on successive pixel pairs, and summing the result obtained for the 5×5 array of pixels.

It is appreciated that the DOG methodology for convolving a pixel array with an approximation of a Laplacian of a Gaussian function may be performed by calculating convolutions with a Gaussian function on various sizes of pixel arrays. For example a satisfactory convolution may be obtained by convolving a 9×9 pixel array with an approximation of a Gaussian function and subtracting the result of convolving a 3×3 pixel array with an approximation of a Gaussian function. Other sizes of pixel arrays may also be used.

Alternatively, the following kernel, providing values suitable for convolving a 5×5 array of pixels with a two dimensional approximation of a Laplacian of a Gaussian function, is particularly appropriate for software implementations:

| 0.0039 | 0.0156 | 0.0234  | 0.0156 | 0.0039 |
|--------|--------|---------|--------|--------|
| 0.0156 | 0.0625 | 0.0938  | 0.0625 | 0.0156 |
| 0.0234 | 0.0938 | −0.8594 | 0.0938 | 0.0234 |
| 0.0156 | 0.0625 | 0.0938  | 0.0625 | 0.0156 |
| 0.0039 | 0.0156 | 0.0234  | 0.0156 | 0.0039 |

A convolution value for a pixel corresponding to the central cell of the kernel is the sum of reflective intensity values for neighboring pixels, corresponding to cells in the kernel, wherein each intensity value is multiplied by a value taken from a corresponding cell in the kernel.

Alternatively, the convolution value may be performed in multiple steps as follows:

An initial convolution of the image is performed with the following kernel:

| 0 | 0 | 0.0625 | 0 | 0 |
|---|---|--------|---|---|
| 0 | 0 | 0.25   | 0 | 0 |
| 0 | 0 | 0.375  | 0 | 0 |
| 0 | 0 | 0.25   | 0 | 0 |
| 0 | 0 | 0.0625 | 0 | 0 |

The output of the above convolution is further convolved with the following kernel:

| 0      | 0    | 0     | 0    | 0      |
|--------|------|-------|------|--------|
| 0      | 0    | 0     | 0    | 0      |
| 0.0625 | 0.25 | 0.375 | 0.25 | 0.0625 |
| 0      | 0    | 0     | 0    | 0      |
| 0      | 0    | 0     | 0    | 0      |

The output of the second convolution thereafter is summed with the following kernel:

| 0 | 0 | 0  | 0 | 0 |
|---|---|----|---|---|
| 0 | 0 | 0  | 0 | 0 |
| 0 | 0 | −1 | 0 | 0 |
| 0 | 0 | 0  | 0 | 0 |
| 0 | 0 | 0  | 0 | 0 |

The result of the summation is a convolved image, which corresponds to image output 162.

Reference is made to FIG. 5G which shows the convolved image output which defines image output 162, which is the result of convolving R image output 124 as hereinabove described. Preferably. the convolved image output 162 has substantially the same resolution as R image output 124, however the gray level values of the pixels in the convolved image output 162 are redefined as a result of the convolution. As seen in FIG. 5G, convolution of the R image output 124 provides a representation of electrical circuit 112 (FIG. 3).

In the convolved image output 162 shown in FIG. 5G, regions that correspond to locations in R image output 124 (FIG. 5B) which exhibit generally uniform intensity of reflected light, for example regions of substrate 166 and regions of a conductor 168 in the convolved image output 162, have a convolution value that is 0 or near 0, and appear in intermediate shades of gray. Regions in convolved image ouput 162 that correspond to locations in R image output 124 (FIG. 5B) which exhibit a relatively strong spatial transition in reflective intensity, such as locations near the edges of conductors 132, have relatively large positive convolution values or relatively large negative convolution values, as compared with the convolution values calculated for regions 166 and 168, and appear as relatively light and relatively dark regions, designated respectively by reference numerals 170 and 172.

It is noted that typically within regions 166 and 168 there may be a variation in the gray scale values assigned to individual pixels. These values may be zero or small numbers above or below zero.

As seen in FIG. 5G, the substrate side of an edge of a conductor typically is assigned a relatively large positive value and appears as a light region 170, and the conductor side of an edge typically is assigned a relatively large negative value and appears as a dark region 172.

In order for the functionality of the override circuit 160 to be understood and appreciated, it is believed that a brief overview of the generation of enhanced representation 29 (FIG. 3) from the convolved image output 162 is in order.

In accordance with a preferred embodiment of the invention, enhanced representation 29 is produced by calculating sub-pixel locations of corresponding zero crossings between pixels having oppositely signed values, preferably based on a linear interpolation between the oppositely signed values. Each zero crossing between oppositely signed pixels represents an approximate location of a transition between regions exhibiting optically distinguishable characteristics. However, as mentioned hereinabove, the convolution of R image output 124 typically results in near zero positive and near zero negative values for regions in convolved image output 162, such as regions 166 and 168, corresponding to locations in the R image output 124 which exhibit nearly uniform intensity of light reflection therefrom. Hence, override circuit 160 normally is required.

As seen in FIG. 3, convolved image output 162 and high-sure/low-sure image output 146 are supplied to override circuit 160, which modifies the convolved image output 162 so that pixels in regions 166 and 168 have uniformly signed (positive or negative) values. Override circuit 160 preferably modifies convolved image output 162 using a controlling input containing at least some image information that is different from image information contained in convolved image output 162, preferably at least partially received from a detector other than the detector providing an output employed by convolver 164. In a preferred embodiment of the invention, the high-sure/low sure image output 146 supplied by high-sure/low-sure region classifier 144 provides the controlling input, preferably in the manner described hereinbelow:

Convolved image 162 and high-sure/low sure image output 146 preferably are analyzed pixel by pixel in override circuit 160. It is appreciated that regions 148 and 150 in high-sure/low-sure image output 146 (FIG. 5F), representative of substrate 130 and conductor 132 (FIG. 3) respectively, preferably each have a characteristic positive or negative sign. Pixels in convolved image 162 that correspond to pixels located in either of low-sure regions or high-sure regions of high-sure/low sure image output 146, such as respective regions 148 and 150 (FIG. 5F), are modified so that they have the same positive or negative sign as the corresponding pixel in the high-sure/low sure image output 146. Thus, for example, if a pixel in region 166 of convolved image 162 has a negative value which is characteristic of conductor, but according to high-sure/low-sure image output 146 the pixel is a low-sure pixel which should have a positive value characteristic of substrate, then the pixel value for the pixel in convolved image 162 is modified by assigning to it a predetermined positive value that is representative of substrate.

The result of operation of override circuit 160 typically is an override map 174 in which the values of some pixels, corresponding to pixels in regions 148 and 150 of high-sure/low sure image output 146, have been modified so that they receive a correct sign which avoids zero-crossings among those pixels. Preferably override map 174 has the same resolution as convolved image 162.

Figure 5H:
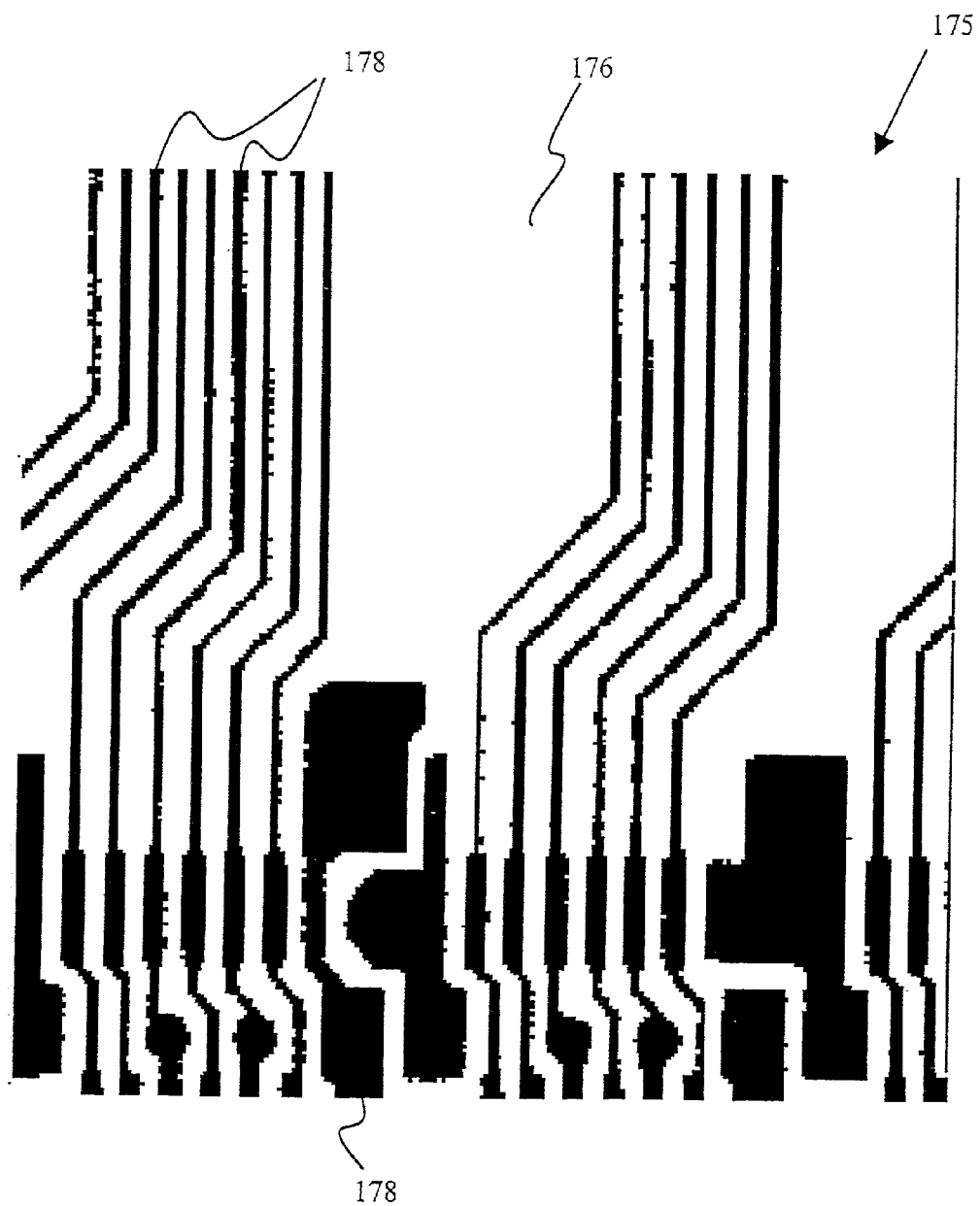

Reference is made to FIG. 5H which shows a modified override map 175 which has been modified for clarity of illustration. Modified override map 175 is a rendition of override map 174 in which, for clarity of illustration, those pixels corresponding to pixels in regions 166 and 168 of FIG. 5G have been assigned binary values according to their respective positive and negative signs. Thus, regions 176 in FIG. 5H, corresponding to regions 166 in FIG. 5G and having positive signs, appear white and regions 178 in FIG. 5H, corresponding to regions 168 in FIG. 5G and having negative signs, appear black.

It is noted that modified override map 175 typically is not used in system 110 and that the large scale of the overrides illustrated therein does not normally take place in reality. Modified override map 175 is provided here in order to illustrate the override mechanism. An accurate illustration of override map 174 would not be illustrative of the override mechanism because the modifications made by override circuit 160 to convolved image 162 to generate override map 174 typically are so subtle that override map 174 is nearly visually indistinguishable from convolved image 162. Moreover, it is appreciated that the grayscale values of pixels in override map 174 are employed to approximate the locations of transitions between oppositely signed pixels.

As further seen in FIG. 3, override map 174 preferably is provided to a zero crossing calculator 179 which operates on override map 174 to calculate zero-crossings between adjacent pixels therein having oppositely signed values. It is appreciated that following operation of override circuit 160, adjacent pixels having oppositely signed values typically exist only among pixels in override map 174 which correspond to pixels located in third region 152 (FIG. 5F), namely pixels which are neither high-sure 150 nor low-sure 148. Generally, pixels corresponding to pixels located in third regions 152 exhibit various degrees of gray, scale. It is further appreciated that by employing high-sure/low-sure image output 146 as a controlling input to override circuit 160, zero-crossings preferably are calculated only for transitions between conductors 132 and substrate 130, and zero-crossings are not calculated for transitions between conductors 134 and substrate 136.

In accordance with a preferred embodiment of the invention, transitions between conductors 132 and substrate 130 are deemed to exist somewhere along imaginary lines connecting the center points of a pair of adjacent side-by-side pixels in override map 174 which have oppositely signed values. The determination of the location of a zero crossing, which approximates the location of a transition between conductor 132 and substrate 130, preferably is made by linear interpolation between the respective values (appearing in for example in FIG. 5G as various shades of gray) of oppositely signed convolution values of adjacent pixels, as described more fully in U.S. Pat. No. 5,774,572, the disclosure of which is hereby incorporated by reference.

Figure 5I:
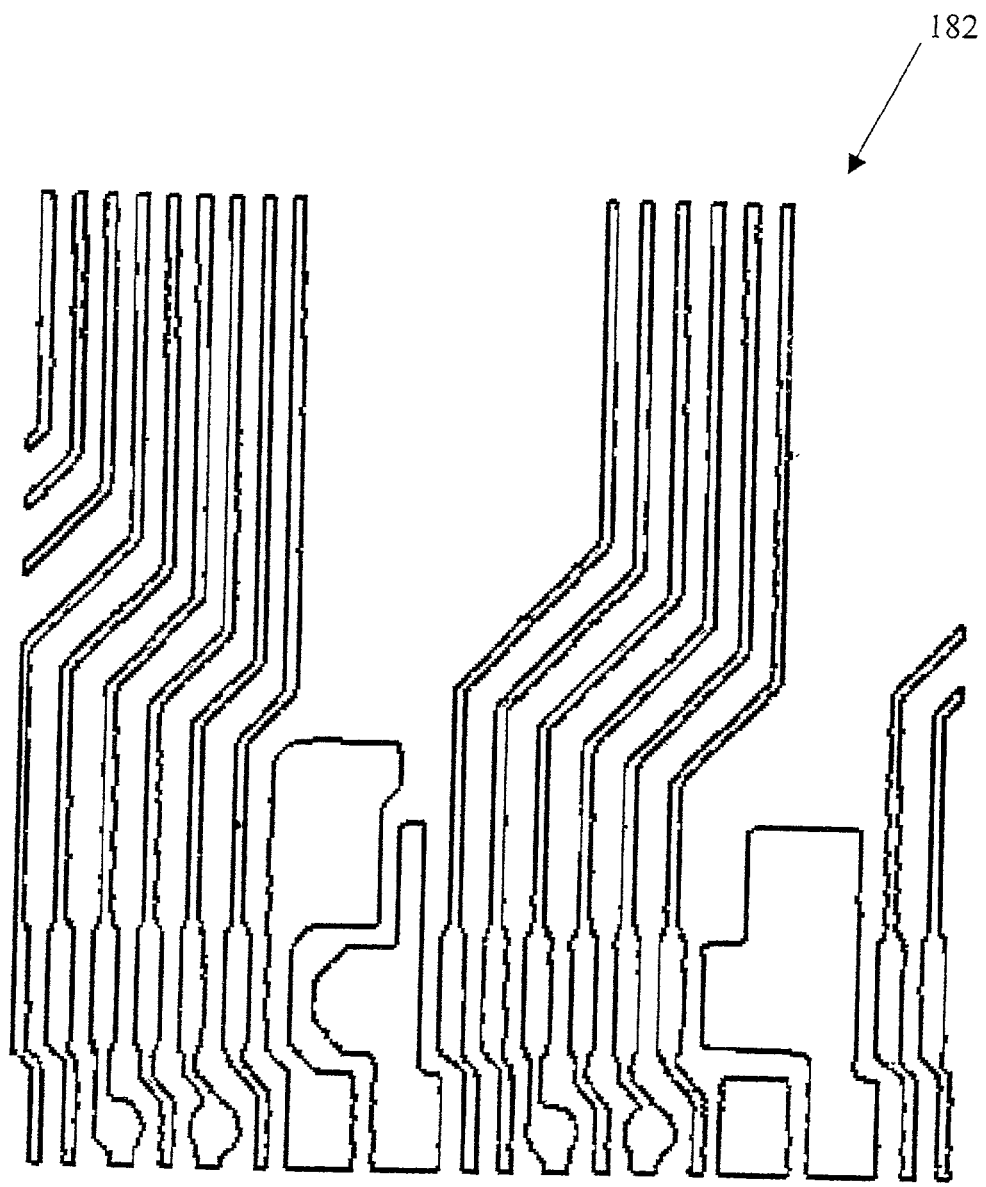
Figure 5J:
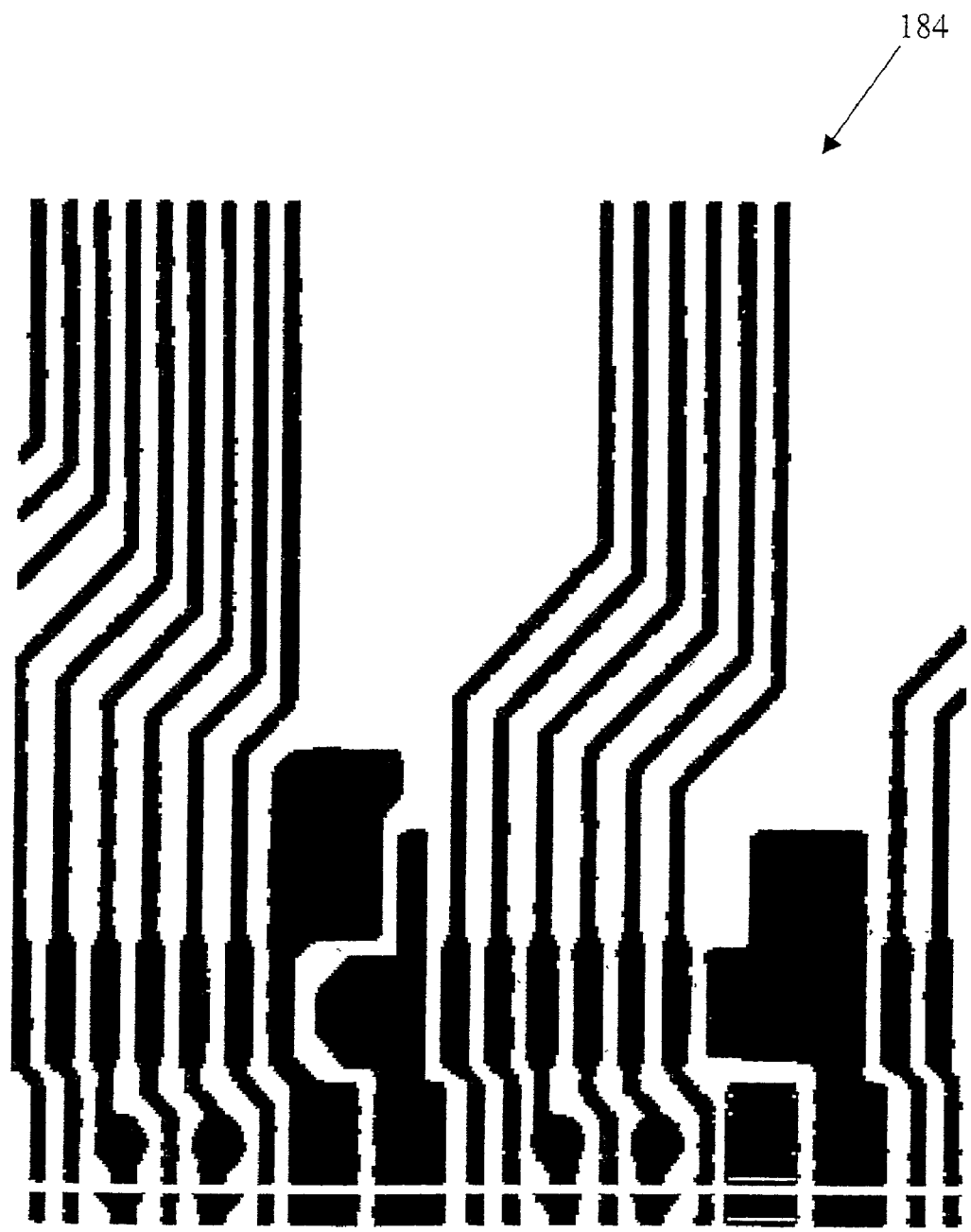

Referring additionally to FIG. 2, the result of calculation of zero crossings in override map 174 (shown in FIG. 2 as the modified override map 175) is provided to an enhanced representation producer 180 which produces enhanced representation 29. Preferably the zero-crossings are connected to provide a contour representation 182 (seen in greater detail in FIG. 5I) of the outline of conductors 132 in electrical circuit 112. It is appreciated that the resulting outline connecting the zero-crossings is drawn to sub-pixel accuracy. Alternatively or additionally, a binary representation 184 (seen in greater detail in FIG. 5J) of conductors 132 and substrate 130 in electrical circuit 112 is produced by utilizing the locations of the zero crossings. The binary representation preferably has a resolution which is spatially enhanced relative to image outputs 124, 126 and 128.

Preferably pixels in a binary representation, such as binary representation 184, are grouped into multi-bit computational pixels having a data structure that indicates the presence or absence of a transition between dark and light regions located inside the computational pixel. Additionally, the data structure preferably indicates a sub-computational pixel location of such a transition for computational pixels in which such a transition occurs. A suitable method of representing binary images with multi-bit computational pixels is described in published PCT patent application WO 0019372, incorporated herein by reference.

Figure 6:
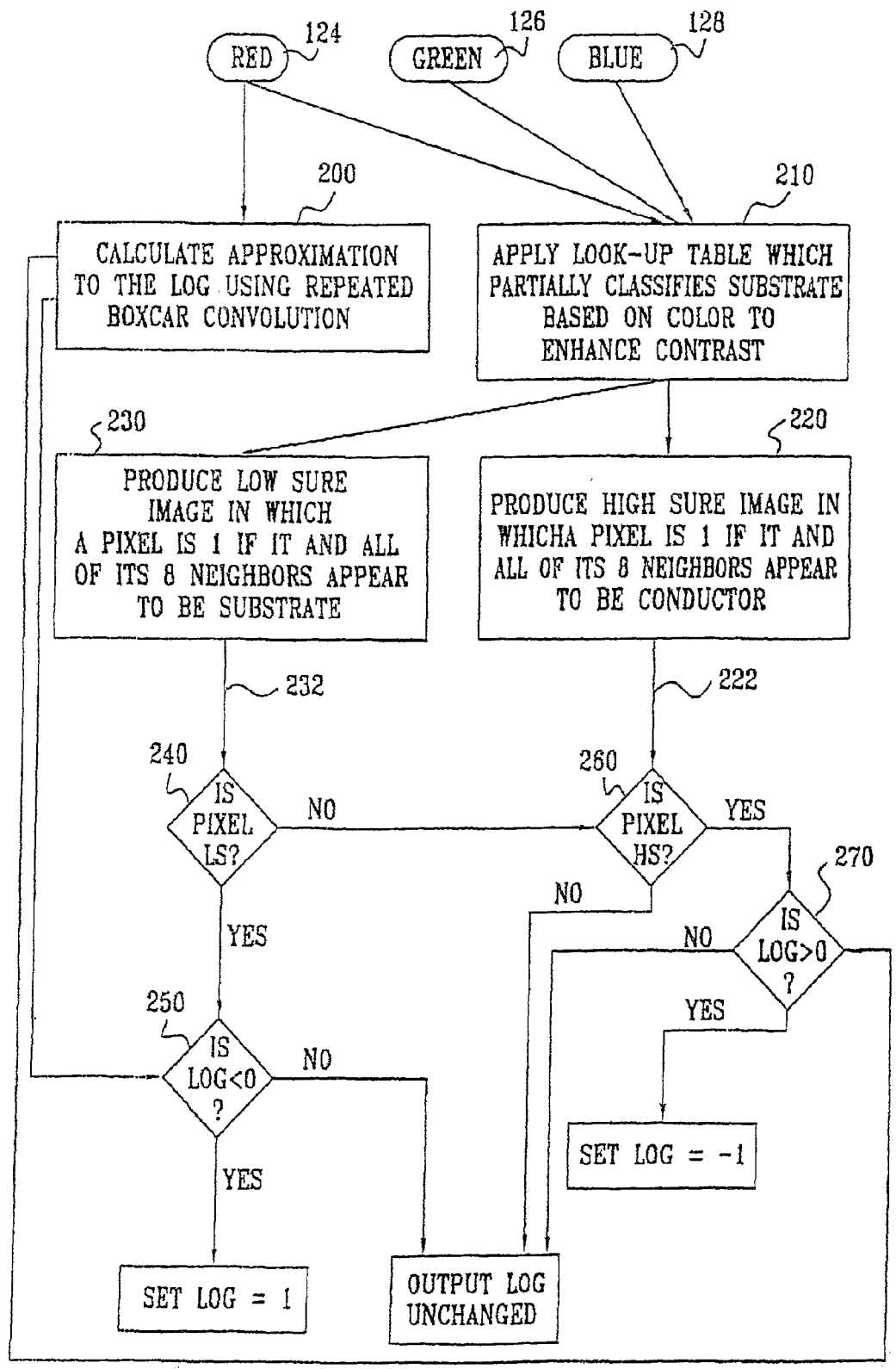
FIG. 6 is simplified flow chart illustration of logic used in a preferred embodiment of a method of calculating convolution values useful for generating an enhanced representation of an electrical circuit.

Reference is now made to FIG. 6 which is a simplified flow chart illustration showing preferred logic employed to calculate pixel values in override map 174 (FIG. 3), which map is used to provide enhanced representation 29 of an electrical circuit 112 being inspected. Red, Green and Blue image outputs 124, 126 and 128 are acquired from respective detectors 118, 120 and 122 (FIG. 3). Red image output 124 is then used to calculate a first approximation to the Laplacian of a Gaussian (LOG) preferably by using a repeated boxcar function (200). Preferably the LOG is obtained using a difference of Gaussians (DOG) methodology by convolving 5×5 neighboring pixels with a 2-dimensional approximation of a Gaussian function obtained from the boxcar function, and then subtracting the value of the central pixel from the 5×5 convolution result substantially as described hereinabove.

In parallel, in the method seen in FIG. 6 a look-up table is applied to Red, Green and Blue outputs 124, 126 and 128 in order to classify substrate 130 (FIG. 3) based on color so as to enhance contrast between substrate 130 and conductors 132, while removing image artifacts associated with non-opaque portions of substrate 130. This step is designated by reference numeral 210. The contrast enhanced image resulting from step 210, for example pseudo image 142 (FIG. 5E) is then used to produce a high-sure image and a low-sure image in steps 220 and 230 respectively. The resulting outputs, designated respectively as 222 and 232 define high-sure/low-sure image output 146 (FIG. 5F).

In producing the low sure image 232 in step 230, each pixel in the contrast enhanced image provided in step 210 is thresholded and preferably is assigned a value of 1 if the pixel itself and all of its 8 immediate neighboring pixels appear to be substrate. In producing the high sure image 222 in step 220, each pixel in the contrast enhanced image is thresholded and preferably is assigned a value of 1 if the pixel itself and all of its 8 immediate neighbors appear to be conductor.

Although the high sure and low sure images in the illustrated methodology are shown as being produced on the basis of an enhanced contrast image, it is appreciated that the production of high sure and low sure images may employ any suitable controlling input including information which is not present in the image input used to calculate the LOGs in step 200, provided that artifacts relating to undesired portions of the electrical circuit being inspected are absent from the controlling input.

A logic sequence is now applied in order to determine whether a pixel retains its LOG value as calculated in step 200, or rather is assigned a LOG value based on evaluation with respect to the high-sure/low sure image produced in steps 220 and 230 respectively.

First, taking the output 232 of step 230, a pixel is analyzed in a step 240 in order to determine whether it is a low sure pixel (LS). If the pixel is a low sure pixel its LOG is evaluated in a step 250 in order to determine whether the LOG has a positive or negative value. If the LOG of a low sure pixel has a positive value, its LOG value is not changed, however if the LOG of a low sure pixel has a negative value, its initial LOG value is assigned a positive value of 1, which is representative of substrate.

Referring now to output 222 of step 220, and to pixels in the output 232 which are not low sure pixels, each pixel is analyzed in step 260 to determine whether it is a high sure pixel (HS). If the pixel is not a high sure pixel, its LOG value is left unchanged. However if the pixel is a high sure pixel, its LOG is value is evaluated in step 270 to determine whether its value is positive or negative. If the LOG value of a high sure pixel is negative, then it is representative of conductor and its LOG value is left unchanged. However if the LOG value of a high sure pixel is positive, its LOG value is assigned a negative value of −1, which is representative of conductor, such as conductor 132 on the top surface of substrate 130 (FIG. 3).

The LOGs resulting from the logic described with reference to FIG. 6 are collected into override map 174 (FIG. 3) which is provided to zero crossing generator 179 (FIG. 3).

It is appreciated by persons skilled in the art that the present invention is not limited to what has been particularly shown and described hereinabove. Rather, the scope of the present invention includes various features described hereinabove as well as modifications and additions thereto which would occur to a person of skill in the art upon reading the foregoing description and which are not in the prior art. By way of non-limiting example, although the invention has been described in the context of a preferred methodology in which convolved image 162 is modified with high-sure/low-sure image output 146 prior to calculating zero crossings, it is to be appreciated by persons skilled in the art that zero crossing may be first calculated directly on convolved image 162, and that erroneous zero crossings may be filtered using a controlling input, such as high-sure/low-sure image output 146.

The invention claimed is:

1. A method of inspecting electrical circuits comprising:
    obtaining first image data relating to at least a part of an electrical circuit;
    obtaining second image data generally corresponding to said part of the electrical circuit, said second image data including at least some image data for an optical characteristic that is different from said first image data;
    generating a first representation of said electrical circuit from said first image data independently of said second image data;
    modifying said first representation by employing said second image data thereby to produce an enhanced representation of the electrical circuit; and
    inspecting the enhanced representation with reference to a reference representation of the electrical circuit to detect defects in the electrical circuit.

2. A method of inspecting electrical circuits according to claim 1 and wherein said first image data is in a first spectral range and second image data includes at least some image data in a second spectral range.

3. A method of inspecting electrical circuits according to claim 1 and also comprising:
enhancing contrast between at least some parts of said second image data representing corresponding parts of the electrical circuit.

4. A method of inspecting electrical circuits according to claim 3 and wherein said enhancing contrast is non-linear.

5. A method of inspecting electrical circuits according to claim 3 and wherein said enhancing contrast includes redefining substrate portions not overlaying conductors in said second image data as opaque substrate portions, thus generally eliminating any distinction between substrate portions which overlay conductors and substrate portions which do not.

6. A method of inspecting electrical circuits according to claim 2 and also comprising:
enhancing contrast between at least some parts of said second image data representing corresponding parts of the electrical circuit.

7. A method of inspecting electrical circuits according to claim 6 and wherein said enhancing contrast is non-linear.

8. A method of inspecting electrical circuits according to claim 1 and wherein said generating a first representation comprises convolving said first image data with a function.

9. A method of inspecting electrical circuits according to claim 8 and wherein said function is an approximation of a Laplacian of a Gaussian function.

10. A method of inspecting electrical circuits according to claim 8 and wherein said modifying is carried out following said convolving.

11. A method of inspecting electrical circuits according to claim 6 and also comprising: convolving said first image data with a function.

12. A method of inspecting electrical circuits according to claim 11 and wherein said function is an approximation of a Laplacian of a Gaussian function.

13. A method of inspecting electrical circuits according to claim 11 and wherein said modifying is carried out following said convolving.

14. A method of inspecting electrical circuits according to claim 1 and also comprising:
determining in said first image data approximate locations of transitions between image regions having distinguishable optical characteristics; and wherein
said modifying comprises removing undesired ones of said transitions.

15. A method of inspecting electrical circuits according to claim 1 and wherein said enhanced representation is a binary representation of said electrical circuit.

16. A method of inspecting electrical circuits according to claim 1 and wherein said enhanced representation is a representation of contours in said electrical circuit, which indicate approximate locations of transitions between regions in said electrical circuit exhibiting distinguishable optical characteristics.

17. A method of inspecting electrical circuits according to claim 1 and wherein said enhanced representation has a spatial resolution that is greater than the spatial resolution of said first and second image data.

18. A method of inspecting electrical circuits according to claim 17 and wherein said enhanced representation has a gray scale whose dynamic range is reduced as compared with the dynamic range of a gray scale of said first and second image data.

19. A method of inspecting electrical circuits according to claim 8 and also comprising:
determining in said first image data approximate locations of transitions between image regions having distinguishable optical characteristics; and wherein
said modifying includes overriding at least part of said convolved first image data.

20. A method of inspecting electrical circuits according to claim 8 and wherein said enhanced representation is a binary representation of said electrical circuit.

21. A method of inspecting electrical circuits according to claim 8 and wherein said enhanced representation is a representation of contours in said electrical circuit, which indicate approximate locations of transitions between regions in said electrical circuit exhibiting distinguishable optical characteristics.

22. A method of inspecting electrical circuits according to claim 8 and wherein said enhanced representation has a spatial resolution that is greater than the spatial resolution of said first and second image data.

23. A method of inspecting electrical circuits according to claim 22 and wherein said enhanced representation has a gray scale whose dynamic range is reduced as compared with the dynamic range of a gray scale of said first and second image data.

24. A method of inspecting electrical circuits according to claim 1 and wherein said first and second image data are acquired with at least one imager comprising at least two different types of optical detectors arranged to view at least a portion of said electrical circuit illuminated by at least one illuminator.

25. A method of inspecting electrical circuits according to claim 24 and wherein said first and second image data are generally spatially coincidental, and each of said first and second image data are in a different spectral range.

26. A system for inspecting electrical circuits comprising:
a first image data acquisition assembly obtaining first image data relating to at least a part of an electrical circuit;
a second image data acquisition assembly obtaining second image data generally corresponding to said part of said electrical circuit, said second image data including at least some image data for an optical characteristic that is different from said first image data;
a first representation generating module generating a first representation of said electrical circuit from said first image data independently of said second image data;
a first representation modifier modifying said first representation by employing said second image data thereby to produce an enhanced representation of the electrical circuit; and
a defect inspector, inspecting the enhanced representation with reference to a reference representation of the electrical circuit to detect defects in the electrical circuit.

27. A system for inspecting electrical circuits according to claim 26 and wherein said first image data is in a first spectral range and second image data includes at least some image data in a second spectral range.

28. A system for inspecting electrical circuits according to claim 26 and also comprising:
a contrast enhancer, enhancing contrast between at least some parts of said second image data representing corresponding parts of the electrical circuit.

29. A system for inspecting electrical circuits according to claim 28 and wherein said contrast enhancer enhances contrast in a non-linear manner.

30. A system for inspecting electrical circuits according to claim 28 and wherein said contrast enhancer is operative to redefine substrate portions not overlaying conductors in said second image data as opaque substrate portions, thus generally eliminating any distinction between substrate portions which overlay conductors and substrate portions which do not.

31. A system for inspecting electrical circuits according to claim 27 and also comprising:
   a contrast enhancer, enhancing contrast between at least some parts of said second image data representing corresponding parts of the electrical circuit.

32. A system for inspecting electrical circuits according to claim 31 and wherein said contrast enhancer enhances contrast in a non-linear manner.

33. A system for inspecting electrical circuits according to claim 26 and wherein said first representation generator comprises a convolver, convolving said first image data with a function.

34. A system for inspecting electrical circuits according to claim 33 and wherein said function is an approximation of a Laplacian of a Gaussian function.

35. A system for inspecting electrical circuits according to claim 33 and wherein said modifier operates downstream of said convolver.

36. A system for inspecting electrical circuits according to claim 31 and also comprising:
   a convolver, convolving said first image data with a function.

37. A system for inspecting electrical circuits according to claim 36 and wherein said function is an approximation of a Laplacian of a Gaussian function.

38. A system for inspecting electrical circuits according to claim 36 and wherein said modifier operates downstream of said convolver.

39. A system for inspecting electrical circuits according to claim 26 and also comprising:
   a transition locator, determining in said first image data approximate locations of transitions between image regions having distinguishable optical characteristics; and wherein
   said modifier is operative to remove undesired ones of said transitions.

40. A system for inspecting electrical circuits according to claim 26 and wherein said enhanced representation is a binary representation of said electrical circuit.

41. A system for inspecting electrical circuits according to claim 26 and wherein said enhanced representation is a representation of contours in said electrical circuit, which indicate approximate locations of transitions between regions in said electrical circuit exhibiting distinguishable optical characteristics.

42. A system for inspecting electrical circuits according to claim 26 and wherein said enhanced representation has a spatial resolution that is greater than the spatial resolution of said first and second image data.

43. A system for inspecting electrical circuits according to claim 42 and wherein said enhanced representation has a gray scale whose dynamic range is reduced as compared with the dynamic range of a gray scale of said first and second image data.

44. A system for inspecting electrical circuits according to claim 33 and also comprising:
   a transition locator, determining in said first image data approximate locations of transitions between image regions having distinguishable optical characteristics; and wherein
   said modifier is operative to override at least part of an output of said convolver.

45. A system for inspecting electrical circuits according to claim 33 and wherein said enhanced representation is a binary representation of said electrical circuit.

46. A system for inspecting electrical circuits according to claim 33 and wherein said enhanced representation is a representation of contours in said electrical circuit, which indicate approximate locations of transitions between regions in said electrical circuit exhibiting distinguishable optical characteristics.

47. A system for inspecting electrical circuits according to claim 33 and wherein said enhanced representation has a spatial resolution that is greater than the spatial resolution of said first and second image data.

48. A system for inspecting electrical circuits according to claim 47 and wherein said enhanced representation has a gray scale whose dynamic range is reduced as compared with the dynamic range of a gray scale of said first and second image data.

49. A system for inspecting electrical circuits according to claim 26 and wherein said first and second image data acquisition assemblies comprise at least one illuminator and at least one imager, comprising at least two different types of optical detectors and being arranged to view at least a portion of said electrical circuit illuminated by said at least one illuminator.

50. A system for inspecting electrical circuits according to claim 49 and wherein said imager comprises three types of detectors, each of which is operative to output generally spatially coincidental image data of said electrical circuit in a respective spectral range.

* * * * *